(12) United States Patent
Imamura

(10) Patent No.: US 11,683,059 B2
(45) Date of Patent: Jun. 20, 2023

(54) NOISE REDUCTION DEVICE

(71) Applicant: HARADA INDUSTRY CO., LTD., Tokyo (JP)

(72) Inventor: Yutaka Imamura, Tokyo (JP)

(73) Assignee: HARADA INDUSTRY CO., LTD., Tokyo (JP)

( * ) Notice: Subject to any disclaimer, the term of this patent is extended or adjusted under 35 U.S.C. 154(b) by 7 days.

(21) Appl. No.: 17/439,747

(22) PCT Filed: Mar. 27, 2020

(86) PCT No.: PCT/JP2020/014289
§ 371 (c)(1),
(2) Date: Sep. 15, 2021

(87) PCT Pub. No.: WO2020/203875
PCT Pub. Date: Oct. 8, 2020

(65) Prior Publication Data
US 2022/0182090 A1    Jun. 9, 2022

(30) Foreign Application Priority Data

Mar. 29, 2019   (JP) .............................. JP2019-068104

(51) Int. Cl.
*H04B 1/12*     (2006.01)
(52) U.S. Cl.
CPC .................... *H04B 1/126* (2013.01)
(58) Field of Classification Search
CPC .................. H04B 1/126; H04B 1/10
See application file for complete search history.

(56) References Cited

U.S. PATENT DOCUMENTS 3,697,997 A * 10/1972 Cooper ..................... G01S 3/48
    342/442
4,373,210 A *  2/1983 Karabinis ............ H04B 7/0857
    455/278.1
4,384,366 A *  5/1983 Kaitsuka ................ H04B 1/126
    455/278.1

(Continued)

FOREIGN PATENT DOCUMENTS

CN            1508982 A       6/2004
CN          101075815 A      11/2007

(Continued)

OTHER PUBLICATIONS

International Preliminary Report on Patentability (IPRP) dated Oct. 14, 2021.

*Primary Examiner* — Jinsong Hu
*Assistant Examiner* — Rui M Hu
(74) *Attorney, Agent, or Firm* — Global IP Counselors, LLP

(57) ABSTRACT

A noise reduction device includes: a combiner to shift a phase of one of a first signal propagating through a first propagation path and a second signal propagating through a second propagation path by a predetermined angle and combine the phase-shifted one signal of the first signal and the second signal with the other signal of the first signal and the second signal; and a phase difference absorption circuit having a phase shift characteristic that reduces a difference between a phase difference between two signals each having a lower limit frequency of a band of the broadcast wave and passing through the first propagation path and the second propagation path and a phase difference between two signals each having an upper limit frequency of the band of the broadcast wave and passing through the first propagation path and the second propagation path.

6 Claims, 24 Drawing Sheets

(56) References Cited

U.S. PATENT DOCUMENTS

| | | | | |
|---|---|---|---|---|
| 4,736,455 A * | 4/1988 | Matsue | | H04B 1/126 |
| | | | | 455/278.1 |
| 5,260,707 A * | 11/1993 | Goldman | | H04K 3/228 |
| | | | | 342/383 |
| 5,263,180 A * | 11/1993 | Hirayama | | H04B 7/084 |
| | | | | 455/245.2 |
| 5,517,686 A * | 5/1996 | Kennedy | | H04B 1/1661 |
| | | | | 455/273 |
| 6,847,803 B1 * | 1/2005 | Rauhala | | H04B 1/126 |
| | | | | 370/347 |
| 8,265,561 B2 * | 9/2012 | Nakamura | | H04B 1/126 |
| | | | | 455/63.1 |
| 9,917,656 B1 * | 3/2018 | van der Ploeg | | H04B 1/126 |
| 10,381,995 B1 * | 8/2019 | Kerselaers | | H04B 1/1027 |
| 2001/0016478 A1 * | 8/2001 | Lindenmeier | | H04B 7/0874 |
| | | | | 455/278.1 |
| 2004/0180633 A1 | 9/2004 | Nakatani et al. | | |
| 2007/0268857 A1 * | 11/2007 | So | | H04B 1/525 |
| | | | | 370/328 |
| 2009/0197558 A1 * | 8/2009 | Shiotsu | | H04B 15/00 |
| | | | | 455/296 |
| 2010/0190461 A1 * | 7/2010 | Ejima | | H01Q 1/521 |
| | | | | 455/272 |
| 2012/0302282 A1 * | 11/2012 | Pascolini | | H03H 7/38 |
| | | | | 333/100 |
| 2013/0010977 A1 * | 1/2013 | Hirano | | H04B 15/005 |
| | | | | 381/71.4 |
| 2013/0210377 A1 * | 8/2013 | Kondo | | H04B 1/1027 |
| | | | | 455/150.1 |
| 2015/0318890 A1 * | 11/2015 | Uejima | | H03H 7/0115 |
| | | | | 455/83 |
| 2016/0099494 A1 * | 4/2016 | Funatsu | | H01Q 21/29 |
| | | | | 343/713 |
| 2016/0269059 A1 * | 9/2016 | Funatsu | | H01Q 1/52 |
| 2021/0273334 A1 * | 9/2021 | Tachibana | | H04B 1/0483 |

FOREIGN PATENT DOCUMENTS

| | | |
|---|---|---|
| CN | 101594164 A | 12/2009 |
| JP | 08154081 A | 6/1996 |
| JP | 09055690 A | 2/1997 |
| JP | 5029510 B2 | 7/2012 |
| JP | 2013098767 A | 5/2013 |
| WO | 2018051758 A1 | 3/2018 |

* cited by examiner

NOISE REDUCTION DEVICE

CROSS-REFERENCE TO RELATED APPLICATIONS

This application is a U.S. national stage application of International Application No. PCT/JP2020/014289, filed on Mar. 27, 2020, which claims priority to Japanese Patent Application No. 2019-068104, filed on Mar. 29, 2019.

TECHNICAL FIELD

The present disclosure relates to a noise reduction device.

BACKGROUND INFORMATION

A technique is known in which a first antenna for receiving a broadcast wave and a second antenna for receiving a noise signal are provided and a signal received by the first antenna and a signal received by the second antenna are combined in opposite phases to remove a noise component from the signal received by the first antenna.

For example, Japanese Patent No. 5,029,510 (Patent Literature 1) discloses a noise reduction device including an external antenna, an in-vehicle antenna, a variable amplifier, a variable phase shifter, a power detection unit, and a demodulation control unit. The noise reduction device adjusts the amplitude and phase of the signal received by the in-vehicle antenna using the variable amplifier and the variable phase shifter, and then adds the adjusted signal to the signal received by the external antenna. At this time, the demodulation control unit controls the variable amplifier and the variable phase shifter so that the output power from the adder detected by the power detection unit is minimized.

By controlling the variable amplifier and the variable phase shifter as described above, the noise reduction device combines the signal received by the in-vehicle antenna and the signal received by the external antenna with the same amplitude and in opposite phases. Thus, by adding up the signals having the same amplitude and the opposite phases, the noise component is removed from the signal received by the external antenna.

SUMMARY

In the device described in Patent Literature 1, since the variable amplifier and the variable phase shifter are feedback-controlled so as to minimize the output power from the adder, complicated calculation processing is required to minimize the noise component of the signal. In particular, in order to perform such complicated calculation processing in real time, a large amount of calculation resources are required, which may complicate the device.

Therefore, it is required to provide a noise reduction device capable of reducing noise with a simple configuration.

In one aspect, a noise reduction device connected to a first antenna for receiving a broadcast wave and a second antenna is provided. The noise reduction device includes: a combiner to shift a phase of one of a first signal propagating through a first propagation path and a second signal propagating through a second propagation path by a predetermined angle and combine the phase-shifted one signal of the first signal and the second signal with the other signal of the first signal and the second signal, wherein the first propagation path is a path of signal reaching the noise reduction device from a noise source of a vehicle via the first antenna and the second propagation path is a path of signal reaching the noise reduction device from the noise source of the vehicle via the second antenna; and a phase difference absorption circuit provided between the first antenna and the combiner or between the second antenna and the combiner. The phase difference absorption circuit has a phase shift characteristic that reduces a difference between a phase difference between two signals each having a lower limit frequency of a band of the broadcast wave and passing through the first propagation path and the second propagation path and a phase difference between two signals each having an upper limit frequency of the band of the broadcast wave and passing through the first propagation path and the second propagation path.

In the noise reduction device according to the aspect described above, the difference between the phase difference between the two signals each having a lower limit frequency of the broadcast wave and passing through the first propagation path and the second propagation path and the phase difference between the two signals each having an upper limit frequency and passing through the first propagation path and the second propagation path is reduced by the phase difference absorption circuit. In this manner, the phase difference between the first signal propagating through the first propagation path and the second signal propagating through the second propagation path can be made close to constant in the entire frequency band of the broadcast wave. Therefore, by shifting the phase of the first signal or the second signal by a predetermined angle, the phase of the first signal and the phase of the second signal can be made to be almost opposite phases. By combining the first signal and the second signal having almost opposite phases by the combiner, noises caused by the noise sources can be canceled out. As a result, it is possible to reduce the noise included in the signal received by the first antenna. In addition, in the noise reduction device, since the first signal and the second signal can be made to have almost opposite phases without feedback control, it is possible to reduce noise with a simple configuration.

In one embodiment, when a first in-band phase deviation indicating a difference between a phase shift amount when a signal having the lower limit frequency passes through the first propagation path and a phase shift amount when a signal having the upper limit frequency passes through the first propagation path is smaller than a second in-band phase deviation indicating a difference between a phase shift amount when a signal having the lower limit frequency passes through the second propagation path and a phase shift amount when a signal having the upper limit frequency passes through the second propagation path, the phase difference absorption circuit is disposed between the first antenna and the combiner. When the first in-band phase deviation is larger than the second in-band phase deviation, the phase difference absorption circuit is disposed between the second antenna and the combiner. In this embodiment, the phase difference between the first signal propagating through the first propagation path and the second signal propagating through the second propagation path can be easily made almost constant.

In one embodiment, the second antenna may be disposed at a position closer to the noise source than the first antenna. By arranging the second antenna near the noise source, the noise signal is mainly supplied to the combiner as a second signal. As a result, when the first signal and the second signal are combined in opposite phases, it is possible to increase the amount of noise suppression.

In one embodiment, an amplitude changer and a phase changer may be further provided, and the amplitude changer and the phase changer may be provided between the first antenna and the combiner or between the second antenna and the combiner. In this embodiment, by adjusting the amplitude changer and the phase changer, the difference between the amplitude of the first signal and the amplitude of the second signal can be reduced, and the first signal and the second signal can be made to have almost opposite phases. Therefore, it is possible to further reduce the noise component of the signal.

In one embodiment, a control unit to acquire power of noise included in the signal combined by the combiner and adjust the amplitude changer and the phase changer so that the power of the noise is reduced may be further provided. In this embodiment, since the amplitude changer and the phase changer are controlled so that the power of the noise is reduced, it is possible to further reduce the noise component. In addition, since the phase difference between the first signal and the second signal is made in almost opposite phases by the phase difference absorption circuit and the combiner, it is possible to reduce the phase control range of the phase changer. Therefore, it is possible to reduce the calculation load for the control.

In one embodiment, the combiner may be a 180° coupler to invert the phase of the one signal and combine the phase-inverted one signal and the other signal. When the first signal and the second signal have the same phase, the first signal and the second signal can be made to have almost opposite phases by using the 180° coupler as a combiner without using another phase shifter.

In one embodiment, the combiner may include: a phase inverter to invert the phase of the one signal; and an adder to add the phase-inverted one signal and the other signal. By using the phase inverter and the adder as a combiner, the cost of the device can be reduced and the dimensions of the device can be reduced.

According to one aspect and various embodiments of the present invention, it is possible to reduce noise with a simple configuration.

BRIEF DESCRIPTION OF DRAWINGS

Referring now to the attached drawings which form a part of this original disclosure.

DETAILED DESCRIPTION OF EMBODIMENTS

Figure 1:
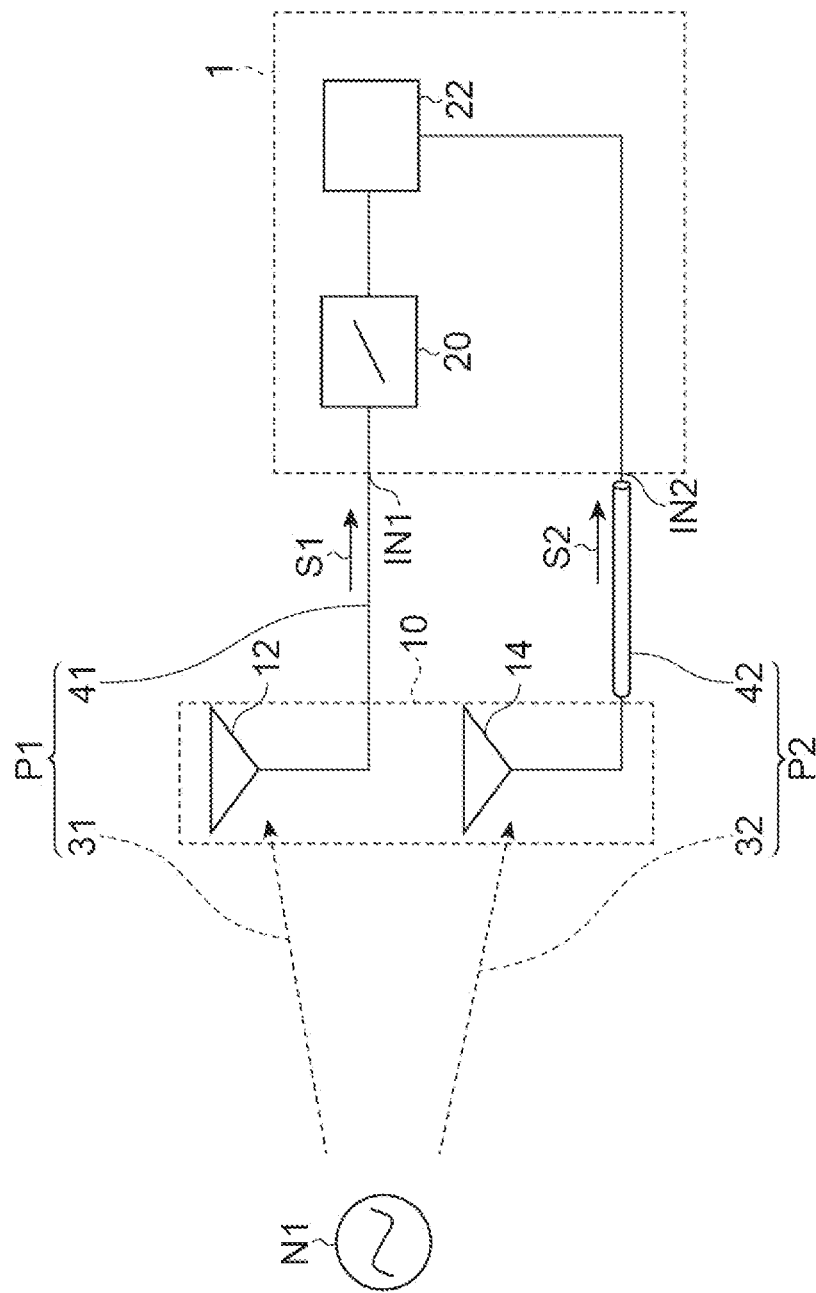
FIG. 1 is a diagram showing the functional configuration of a noise reduction device according to a first embodiment.

Hereinafter, preferred embodiments of the present invention will be described in detail with reference to the accompanying diagrams. In addition, in the following description, the same elements or elements having the same function are denoted by the same reference numerals, and repeated description thereof will be omitted.

First Embodiment

FIG. 1 is a diagram showing the functional configuration of a noise reduction device 1 according to a first embodiment. As shown in FIG. 1, the noise reduction device 1 is connected to an in-vehicle antenna device 10 including a first antenna 12 and a second antenna 14. The first antenna 12 is an antenna for receiving a broadcast wave. The second antenna 14 is an antenna for receiving a noise signal from a noise source N1, and is provided at a position closer to the noise source N1 than the first antenna 12.

The first antenna 12 receives a noise signal output from the noise source N1 together with a broadcast wave. As shown in FIG. 1, the noise signal output from the noise source N1 propagates through a space propagation path 31 and is received by the first antenna 12. A first signal S1 including the broadcast wave signal received by the first antenna 12 and the noise signal from the noise source N1 passes through a conducting wire propagation path 41 and is input to an input terminal IN1 of the noise reduction device 1. In addition, the noise signal output from the noise source N1 propagates through a space propagation path 32 and is also received by the second antenna 14. A second signal S2 received by the second antenna 14 passes through a conducting wire propagation path 42 and is input to an input terminal IN2 of the noise reduction device 1.

The noise reduction device 1 has a function of removing a noise component included in the first signal S1 by combining the first signal S1 received by the first antenna 12 and the second signal S2 received by the second antenna 14 in opposite phases. As shown in FIG. 1, the noise reduction device 1 includes a phase difference absorption circuit 20 and a combiner 22. The combiner 22 is a 180° coupler that inverts the phase of one of the first signal S1 and the second signal S2 and combines the phase-inverted one signal and the other signal of the first signal S1 and the second signal S2. The combiner 22 of the present embodiment inverts the phase of the second signal S2 and combines the phase-inverted second signal S2 with the first signal S1.

The phase difference absorption circuit 20 is provided between the first antenna 12 and the combiner 22. The phase difference absorption circuit 20 has a function of delaying the phase of the first signal S1 by an angle corresponding to the frequency. The details of the function of the phase difference absorption circuit 20 will be described later.

First, in order to facilitate the understanding of the invention, a problem that occurs when the first signal S1 and the second signal S2 are combined in opposite phases will be described.

Figure 2:
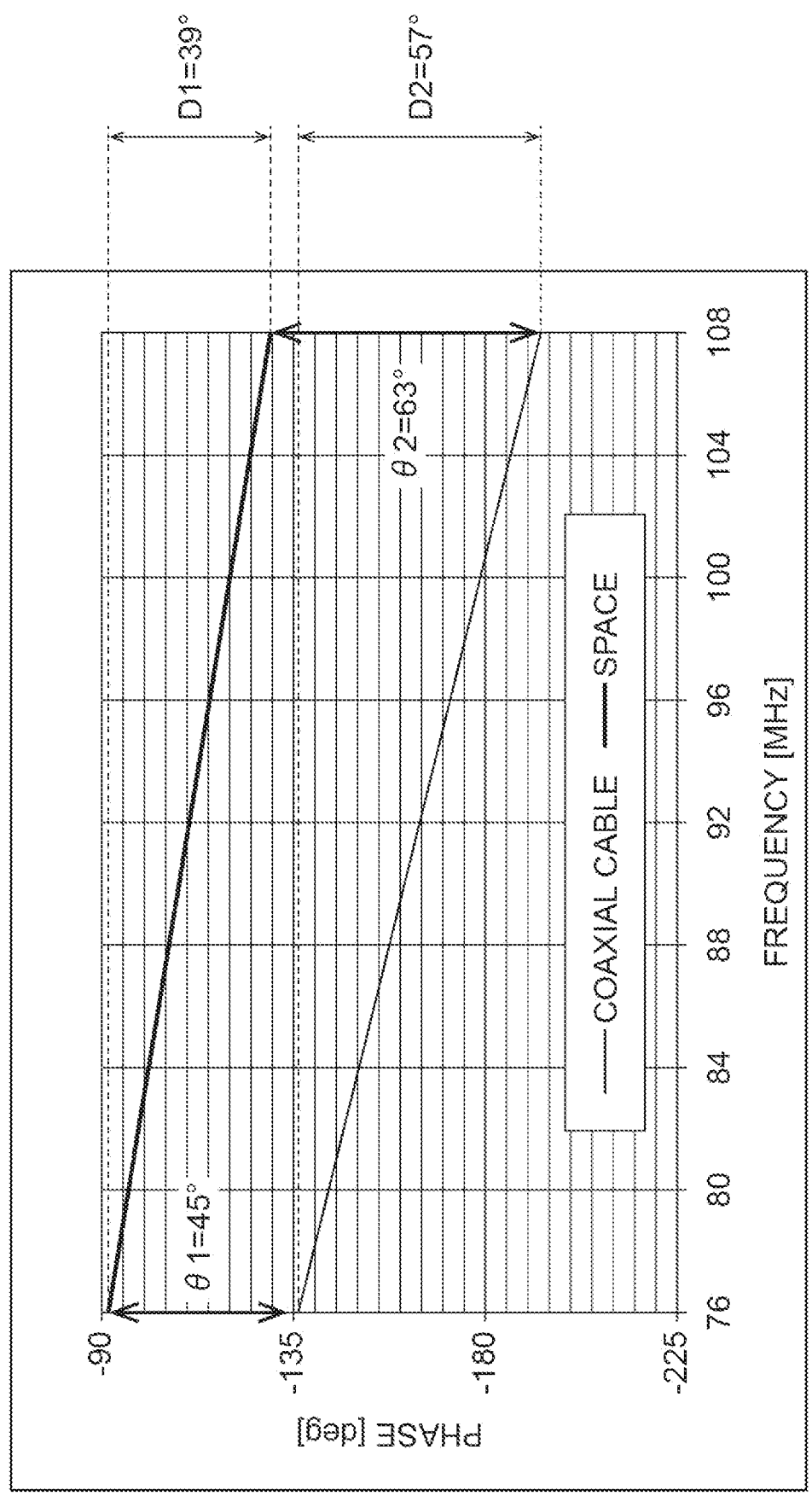
FIG. 2 is a diagram showing a phase shift characteristic per unit distance of a space and a coaxial cable.

The phase of a signal propagating through a transmission line changes depending on the medium of the transmission line, the propagation path length, and the frequency of the signal. FIG. 2 shows the phase shift characteristic per unit distance in space and the phase shift characteristic per unit distance of the coaxial cable. Here, the phase shift characteristic per unit distance indicates the phase shift amount that occurs in the signal when the signal travels through the transmission line by a unit distance (1 m). As shown in FIG. 2, the transmission line formed of space and the transmission line formed of coaxial cable have different phase shift characteristics. Such a difference is due to the fact that the medium of the transmission line has a unique wavelength shortening rate. For example, the coaxial cable has a wavelength shortening rate of 67% as compared with space. The wavelength shift characteristic of the transmission line can be obtained from the wavelength shortening rate of the medium forming the transmission line.

As shown in FIG. 2, when a signal having a frequency of 76 MHz (lower limit frequency of the FM band) travels through the space by a unit distance, a phase shift of −91° occurs in the signal (that is, the phase is delayed by 91°). On the other hand, when a signal having a frequency of 108 MHz (upper limit frequency of the FM band) travels through the space by 1 m, a phase shift of −130° occurs in the signal (phase is delayed by 130°). Here, assuming that the difference between the phase shift amount when the signal having a frequency of 76 MHz travels through the space by a unit distance and the phase shift amount when the signal having a frequency of 108 MHz travels through the space by a unit distance is a first in-band phase deviation D1, the first in-band phase deviation D1 is 39°.

In addition, when the signal having a frequency of 76 MHz travels through the coaxial cable by a unit distance, a phase shift of −136° occurs in the signal (phase is delayed by 136°). On the other hand, when the signal having a frequency of 108 MHz travels through the coaxial cable by a unit distance, a phase shift of −193° occurs in the signal (phase is delayed by 193°). Here, assuming that the difference between the phase shift amount when the signal having a frequency of 76 MHz travels through the coaxial cable by a unit distance and the phase shift amount when the signal having a frequency of 108 MHz travels through the coaxial cable by a unit distance is a second in-band phase deviation D2, the second in-band phase deviation D2 is 57°.

Here, a case where two signals propagate through the space and the coaxial cable, respectively, will be examined. As shown in FIG. 2, when two signals each having a frequency of 76 MHz travel through the space and the coaxial cable by a unit distance, a phase difference θ1 between the two signals is 45°. On the other hand, when two signals each having a frequency of 108 MHz travel the space and the coaxial cable by a unit distance, a phase difference θ2 between the two signals is 63°. In this example, by delaying (phase-shifting) the phase of the signal propagating through the space by a predetermined angle using a phase shifter that delays the phase by 45°, the phase shift amount when the signal having a frequency of 76 MHz travels through the space by a unit distance becomes 136°, so that the phase shift amount when the signal having a frequency of 76 MHz travels through the space by a unit distance can be made equal to the phase shift amount when the signal having a frequency of 76 MHz travels through the coaxial cable by a unit distance. Therefore, for the signal having a frequency of 76 MHz, a signal output from the phase shifter and a signal propagating through the coaxial cable have the same phase. Then, by combining the two signals having the same phase with a 180° coupler, it is possible to combine the two signals in opposite phases.

On the other hand, when the frequencies of the two signals are 108 MHz, the phase difference θ2 between the two signals is 63°. Therefore, when the phase is delayed by 45° using the same phase shifter, a phase difference of 18° (=θ2-θ1) remains between the two signals. Therefore, even if these two signals are combined by a 180° coupler, these two signals cannot be combined in opposite phases. As described above, the phase shift amount of a signal depends not only on the medium of the transmission line and the propagation path length but also on the frequency of the signal. For this reason, it is difficult to eliminate the phase difference between two signals propagating through different propagation paths in the entire frequency band of the broadcast wave. In particular, in broadcasting waves in high frequency bands, such as a DAB band (digital radio broadcasting, 174 MHz to 240 MHz) and a DTV band (digital television broadcasting. 470 MHz to 710 MHz), the phase difference between the two signals tends to be large.

Figure 3:
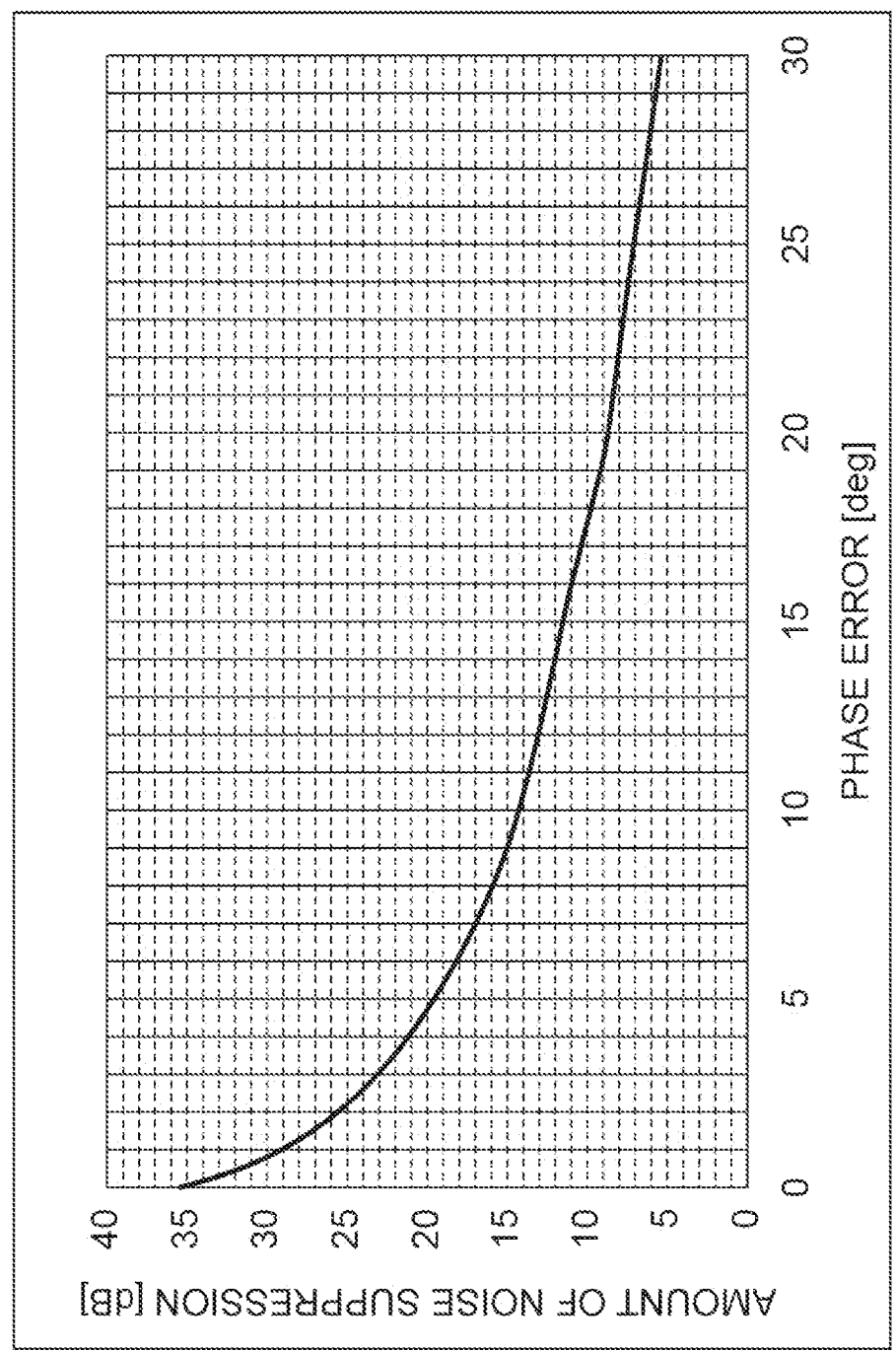
FIG. 3 is a diagram showing a relationship between a phase error and the amount of noise suppression.

FIG. 3 shows a relationship between the phase error (amount of deviation from the opposite phase) between two signals and the amount of noise suppression. As shown in FIG. 3, the amount of noise suppression decreases as the phase error between the two signals increases. For example, when the phase error is 0°, the amount of noise suppression is 35 dB, whereas when the phase error is 18°, the amount of noise suppression is reduced to 10 dB. Thus, in order to reduce noise by combining the two signals, it is required to combine the two signals in almost opposite phases in the entire frequency band of the broadcast wave.

Figure 4:
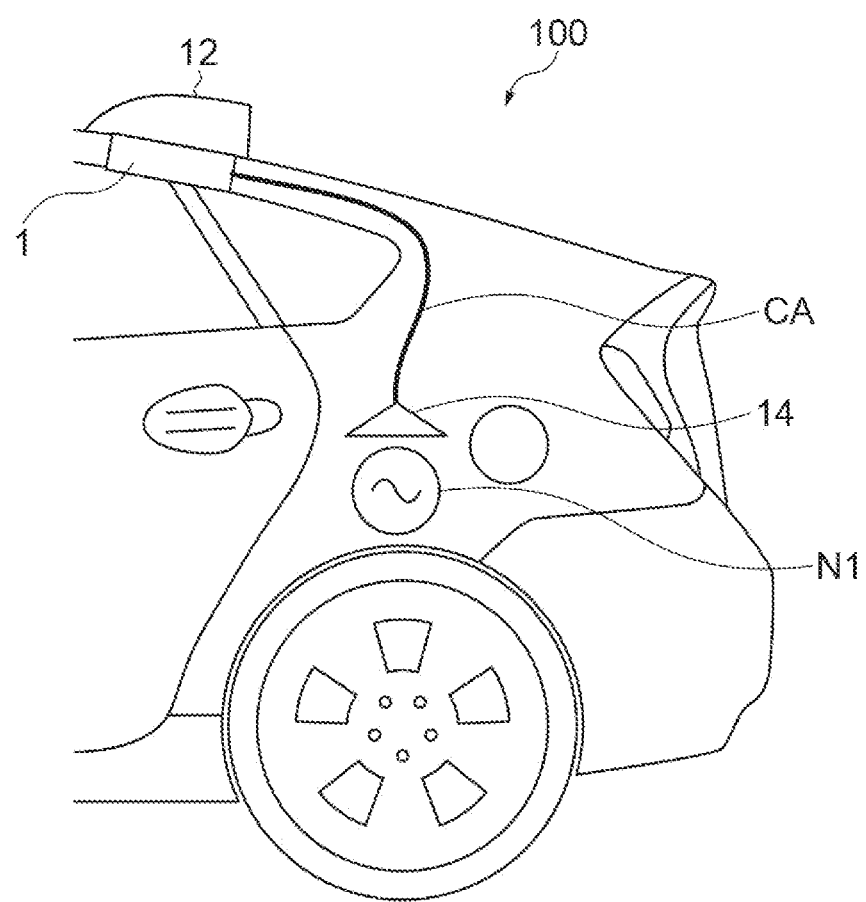
FIG. 4 is a diagram showing a first arrangement example of the noise reduction device.

Hereinafter, the functional configuration of the noise reduction device 1 will be described in more detail based on a specific example. FIG. 4 shows a first arrangement example of the noise reduction device 1 attached to a vehicle 100.

In the first arrangement example, the first antenna 12 is mounted on the roof panel of the vehicle 100. The second antenna 14 is disposed in the vicinity of the noise source N1 of the vehicle 100. An inverter, a motor, and the like are exemplified as the noise source N1 of the vehicle 100, but the noise source N1 is not limited thereto.

The noise reduction device 1 is electrically connected to the first antenna 12 and the second antenna 14. In the example shown in FIG. 4, the noise reduction device 1 is disposed in the vicinity of the first antenna 12. In addition, the noise reduction device 1 is disposed so as to be separated from the second antenna 14, and the noise reduction device 1 and the second antenna 14 are connected to each other by a coaxial cable CA. The length of the coaxial cable CA is assumed to be 1 m.

In the first arrangement example, it is assumed that the separation distance between the noise source N1 and the first antenna 12 is 1 m. Therefore, the propagation path length of the space propagation path 31 is 1 m. On the other hand, since the second antenna 14 is disposed in the vicinity of the noise source N1, the propagation path length of the space propagation path 32 can be ignored.

In addition, since the noise reduction device 1 is disposed in the vicinity of the first antenna 12, the propagation path length of the conducting wire propagation path 41 can be ignored. Since the second antenna 14 and the noise reduction device 1 are connected to each other by the coaxial cable CA of 1 m, the propagation path length of the conducting wire propagation path 42 is 1 m. In addition, it is assumed that the propagation path length between the input terminal IN1 and the combiner 22 and the propagation path length between the input terminal IN2 and the combiner 22 are the same.

In the first arrangement example, the noise signal output from the noise source N1 propagates through the space propagation path 31 and the conducting wire propagation path 41 and is input to the input terminal IN1 of the noise reduction device 1 (see FIG. 1). Here, assuming that the path of the signal that reaches the input terminal IN1 of the noise reduction device 1 from the noise source N1 through the first antenna 12 is a first propagation path P1, the first propagation path P1 has a space propagation path 31 of 1 m and a conducting wire propagation path 41 of substantially 0 m. The phase shift characteristic of the first propagation path P1 is a combination of the phase shift characteristic of the space propagation path 31 and the phase shift characteristic of the conducting wire propagation path 41.

In addition, the noise signal output from the noise source N1 propagates through the space propagation path 32 and the conducting wire propagation path 42 and is input to the input terminal IN2 of the noise reduction device 1. Here, assuming that the path of the signal that reaches the input terminal IN2 of the noise reduction device 1 from the noise source N1 through the second antenna 14 is a second propagation path P2, the second propagation path P2 has a space propagation path 32 of substantially 0 m and a conducting wire propagation path 42 of 1 m. The phase shift characteristic of the second propagation path P2 is a combination of the phase shift characteristic of the space propagation path 32 and the phase shift characteristic of the conducting wire propagation path 42.

Figure 5:
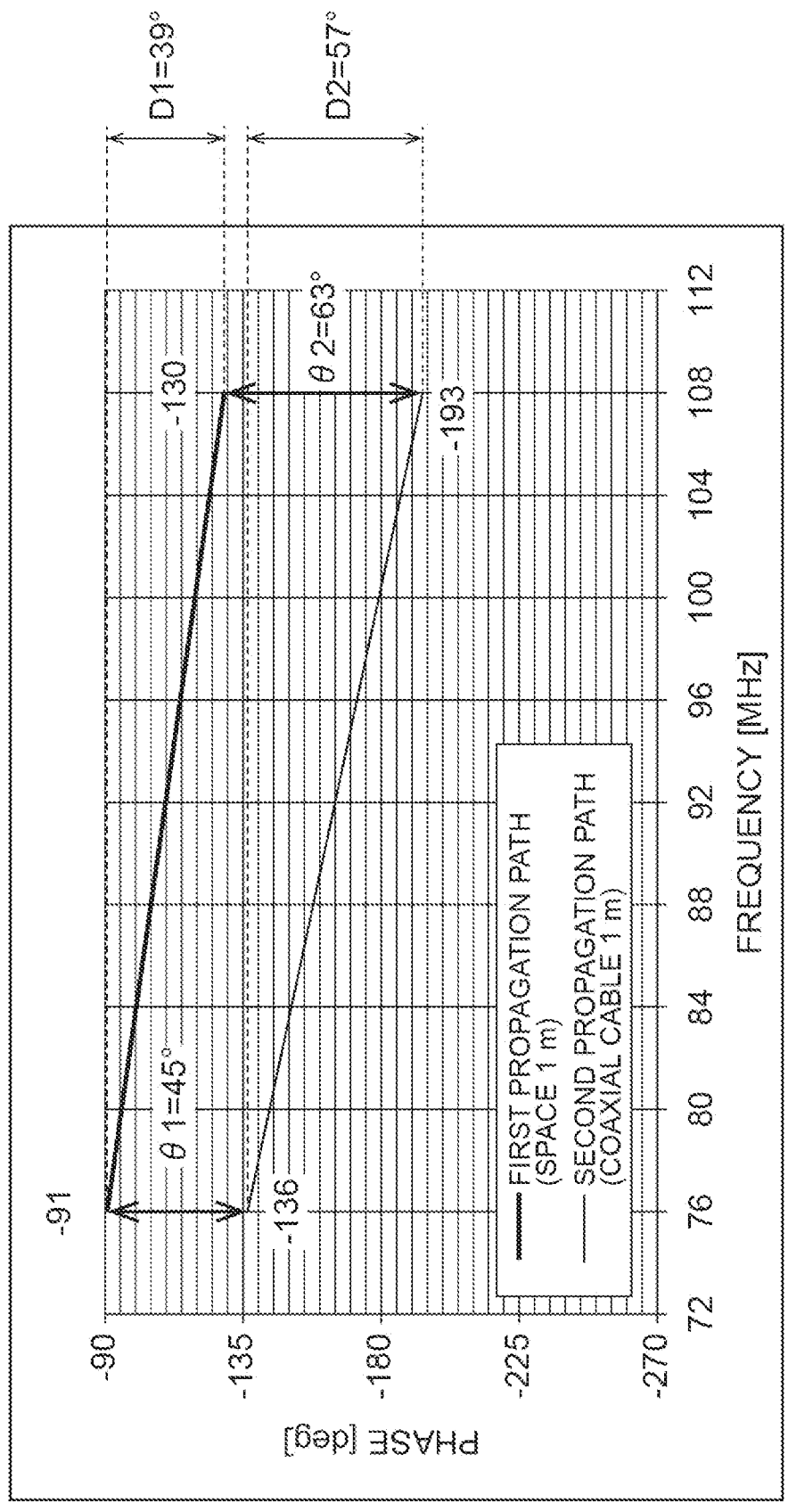
FIG. 5 is a diagram showing a phase shift characteristic of a first propagation path and a second propagation path in the first arrangement example.
Figure 6A:
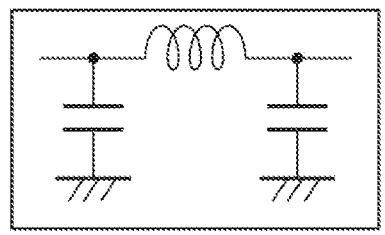
FIG. 6(a) to FIG. 6(d) are diagrams showing an example of the circuit configuration of a phase difference absorption circuit.
Figure 6B:
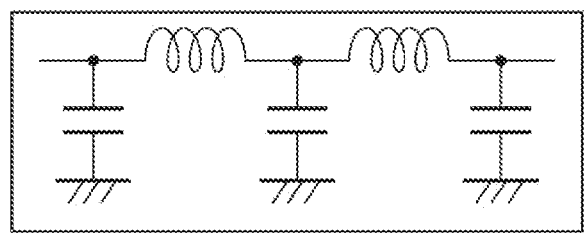
Figure 6C:
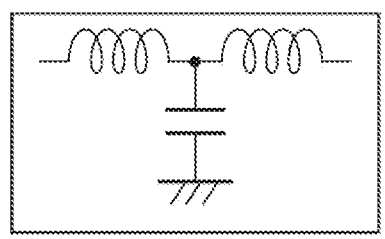
Figure 6D:
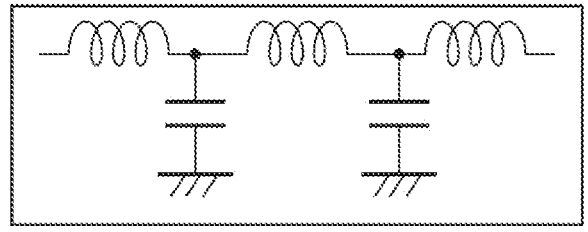

FIG. 5 shows the phase shift characteristics of the first propagation path P1 and the second propagation path P2 in the first arrangement example. As shown in FIG. 5, when a signal having a frequency of 76 MHz (lower limit frequency of the FM band) passes through the first propagation path P1, a phase shift of −91° occurs in the signal. On the other hand, when a signal having a frequency of 108 MHz passes through the first propagation path P1, a phase shift of −130° occurs in the signal. Here, the first in-band phase deviation D1 indicating the difference between the phase shift amount when the signal having a frequency of 76 MHz passes through the first propagation path P1 and the phase shift amount when the signal having a frequency of 108 MHz passes through the first propagation path P1 is 39°.

In addition, when a signal having a frequency of 76 MHz passes through the second propagation path P2, a phase shift of −136° occurs in the signal. On the other hand, when a signal having a frequency of 108 MHz passes through the second propagation path P2, a phase shift of −193° occurs in the signal. Here, the second in-band phase deviation D2 indicating the difference between the phase shift amount when the signal having a frequency of 76 MHz passes through the second propagation path P2 and the phase shift amount when the signal having a frequency of 108 MHz passes through the second propagation path P2 is 57°.

In addition, as shown in FIG. 5, when two signals having a frequency of 76 MHz pass through the first propagation path P1 and the second propagation path P2, the phase difference θ1 between the two signals is 45°. On the other hand, when two signals having a frequency of 108 MHz pass through the first propagation path P1 and the second propagation path P2, the phase difference θ2 between the two signals is 63°. The phase difference absorption circuit 20 of the noise reduction device 1 has a phase shift characteristic that reduces a difference between the phase difference θ1 and the phase difference θ2.

Figure 7:
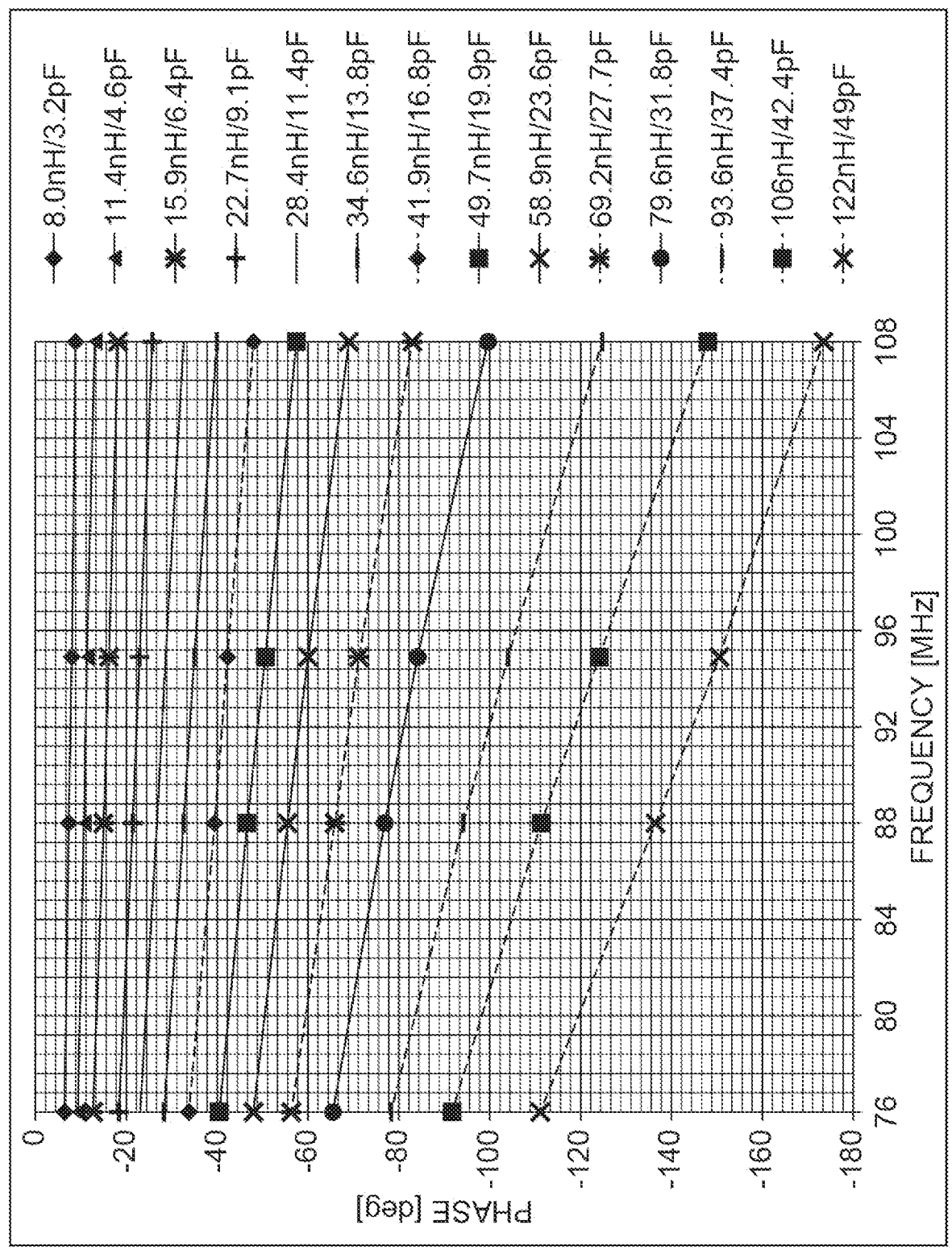
FIG. 7 is a diagram showing a phase shift characteristic of a phase difference absorption circuit.

FIGS. 6(*a*) to 6(*d*) show an example of the circuit configuration of the phase difference absorption circuit 20. As shown in FIGS. 6(*a*) to 6(*d*), the phase difference absorption circuit 20 includes an inductor and a capacitor. FIG. 6(*a*) shows the circuit configuration of the phase difference absorption circuit 20 according to the π-type one-stage configuration, and FIG. 6(*b*) shows the circuit configuration of the phase difference absorption circuit 20 according to the x-type two-stage configuration. In addition, FIG. 6(*c*) shows the circuit configuration of the phase difference absorption circuit 20 according to the T-type one-stage configuration, and FIG. 6(*d*) shows the circuit configuration of the phase difference absorption circuit 20 according to the T-type two-stage configuration. The phase difference absorption circuit 20 can obtain various phase shift characteristics by changing the inductance and the capacitance of circuit elements. FIG. 7 shows the phase shift characteristic of the phase difference absorption circuit 20 when the inductance and the capacitance of circuit elements are changed to various values. In addition, the phase difference absorption circuit 20 may have a circuit configuration of three or more stages.

Figure 8:
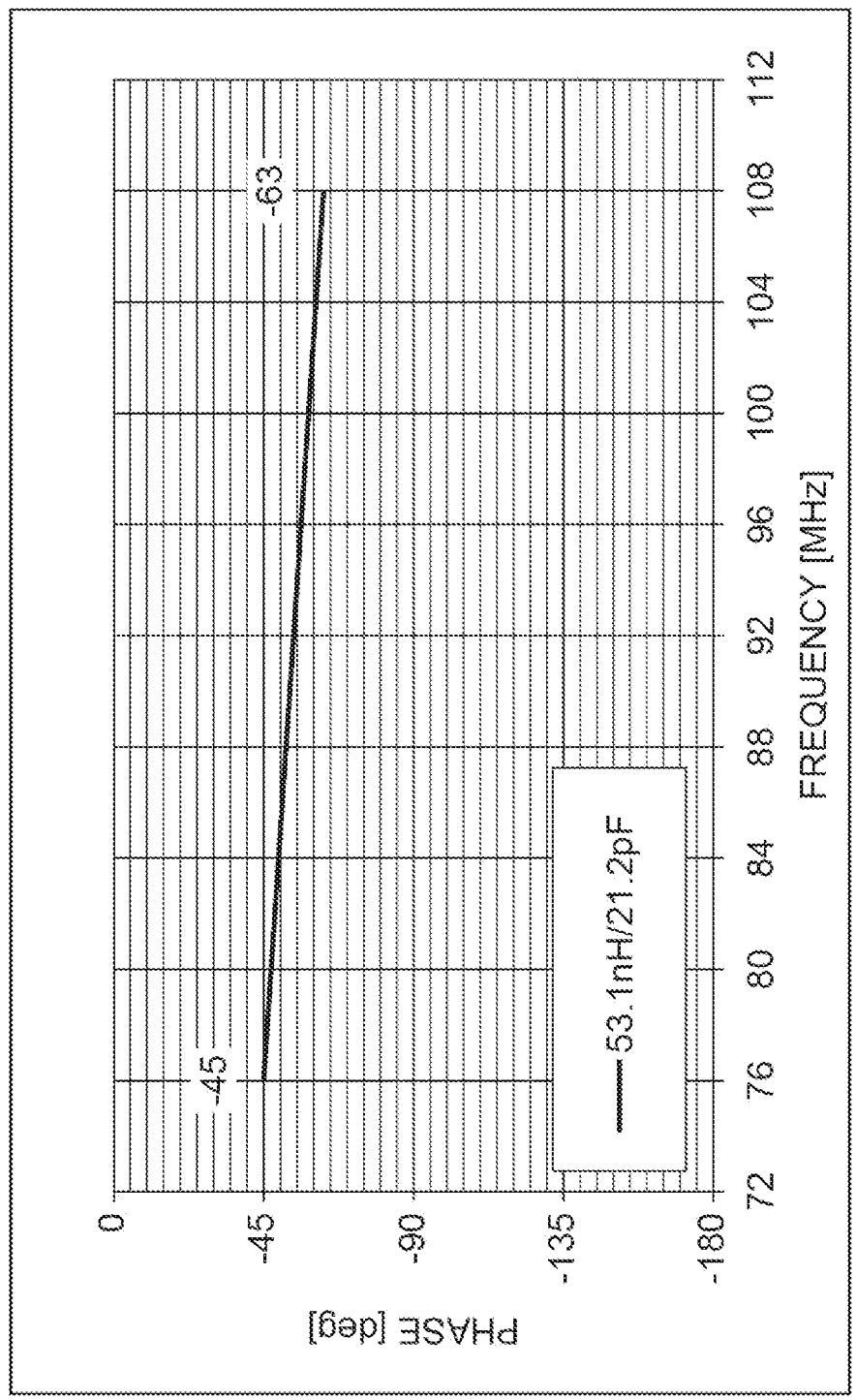
FIG. 8 is a diagram showing a phase shift characteristic of a phase difference absorption circuit used in the first arrangement example.

FIG. 8 shows the phase shift characteristic of the phase difference absorption circuit 20 used in the first arrangement example. In addition, the phase shift characteristic of the phase difference absorption circuit 20 indicates the phase shift amount of the output signal with respect to the input signal of the phase difference absorption circuit 20. The phase shift characteristic shown in FIG. 8 can be obtained by making the circuit configuration of the phase difference absorption circuit 20 be a π-type one-stage configuration having an inductance of 53.1 nH and a capacitance of 21.2 pF.

As shown in FIG. 8, when a signal having a frequency of 76 MHz is input, the phase difference absorption circuit 20 outputs the signal after shifting the phase of the signal by −45°. In addition, when a signal having a frequency of 108 MHz is input, the phase difference absorption circuit 20 outputs the signal after shifting the phase of the signal by −63°. As shown in FIG. 1, the phase difference absorption circuit 20 is provided between the first antenna 12 and the combiner 22. Therefore, the phase difference absorption circuit 20 changes the phase of the first signal S1 received by the first antenna 12 according to the phase shift characteristic.

In the first arrangement example, when a noise signal having a frequency of 76 MHz is output from the noise source N1, a phase shift of −91° occurs in the noise signal due to propagating through the first propagation path P1 (see FIG. 5), and a phase shift of −45° occurs in the noise signal due to passing through the phase difference absorption circuit 20 (see FIG. 8). As a result, a phase shift of −136° occurs in this noise signal. On the other hand, when a noise signal having a frequency of 108 MHz is output from the noise source N1, a phase shift of −130° occurs in the noise signal due to passing through the first propagation path P1 (see FIG. 5), and a phase shift of −63° occurs in the noise signal due to passing through the phase difference absorption circuit 20 (see FIG. 8). As a result, a phase shift of −193° occurs in this noise signal. As described above, the phase shift characteristic in which the phase delay characteristic of the first propagation path P1 and the phase shift characteristic of the phase difference absorption circuit 20 are combined matches the phase shift characteristic of the second propagation path P2. Therefore, the phase of the noise component of the first signal S1 that has passed through the first propagation path P1 and the phase difference absorption circuit 20 and the phase of the second signal S2 that has passed through the second propagation path P2 become the same.

The first signal S1 phase-shifted by the phase difference absorption circuit 20 is input to the combiner 22. The combiner 22 inverts the phase of the second signal S2 and combines the first signal S1 output from the phase difference absorption circuit 20 and the phase-inverted second signal S2. Since the noise component of the first signal S1 and the noise component of the second signal S2 are combined in opposite phases by this combination, the noise component included in the second signal S2 is removed from the first signal S1.

In the above example, the phase difference absorption circuit 20 has a phase shift characteristic that makes the difference between the phase difference θ1 and the phase difference θ2 be 0°. However, the phase difference absorption circuit 20 may have at least a phase shift characteristic that reduces the difference between the phase difference θ1 and the phase difference θ2. By reducing the difference between the phase difference θ1 and the phase difference θ2, the noise component of the first signal S1 and the second signal S2 can be brought close to the same phase in the entire frequency band of the broadcast wave. Therefore, by combining these signals using the combiner 22, the noise component included in the second signal S2 is removed from the first signal S1.

Next, the noise reduction device 1 according to a second arrangement example will be described. It is assumed that the first propagation path P1 in the second arrangement example has a space propagation path 31 having a propagation path length of 1 m and a conducting wire propagation path 41 having a propagation path length of substantially 0 m. In addition, it is assumed that the second propagation path P2 in the second arrangement example has a space propagation path 32 having a propagation path length of substantially 0 m and a conducting wire propagation path 42 having a propagation path length of 1.2 m. That is, the second arrangement example is different from the first arrangement example in that the propagation path length of the conducting wire propagation path 42 is 1.2 m.

Figure 9:
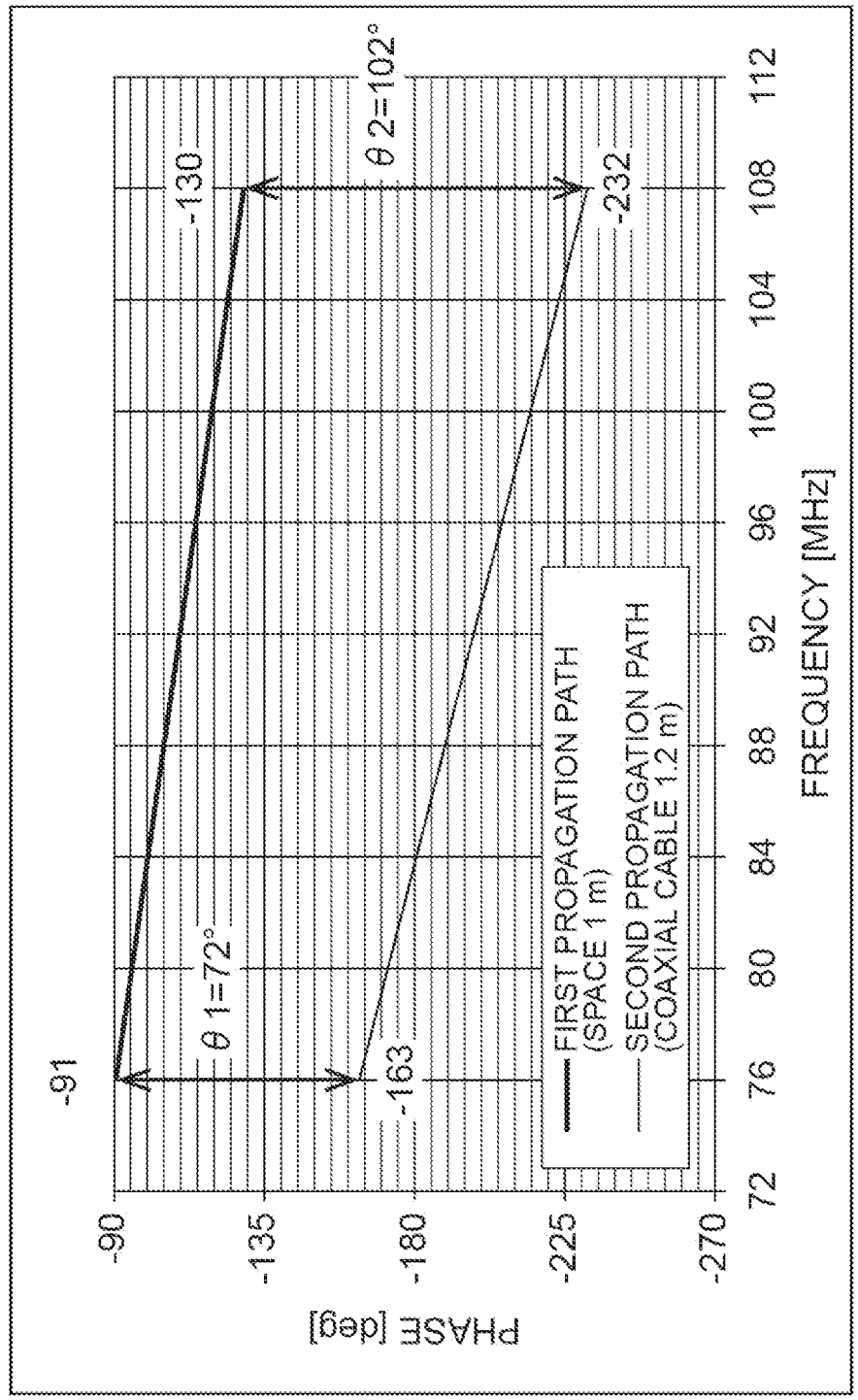
FIG. 9 is a diagram showing a phase shift characteristic of a first propagation path and a second propagation path in a second arrangement example.

FIG. 9 shows the phase shift characteristics of the first propagation path P1 and the second propagation path P2 according to the second arrangement example. The phase shift characteristic of the first propagation path P1 according to the second arrangement example is the same as the phase shift characteristic of the first propagation path P1 according to the first arrangement example. As shown in FIG. 9, when a signal having a frequency of 76 MHz (lower limit frequency of the FM band) passes through the second propagation path P2, a phase shift of −163° occurs in the signal. On the other hand, when a signal having a frequency of 108 MHz passes through the second propagation path P2, a phase shift of −232° occurs in the signal.

In addition, as shown in FIG. 9, the phase difference θ1 between two signals having a frequency of 76 MHz that have passed through the first propagation path P1 and the second propagation path P2, respectively, from the noise source N1 is 72°. On the other hand, the phase difference θ2 between two signals having a frequency of 108 MHz that have passed through the first propagation path P1 and the second propagation path P2, respectively, from the noise source N1 is 102°. The phase difference absorption circuit 20 of the noise reduction device 1 has a phase shift characteristic that reduces a difference between the phase difference θ1 and the phase difference θ2.

The phase difference absorption circuit 20 used in the second arrangement example has a two-stage configuration. The first stage portion of the phase difference absorption circuit 20 has an inductance of 53.1 nH and a capacitance of 21.2 pF, and has the phase shift characteristic shown in FIG. 8. The second stage portion of the phase difference absorption circuit 20 has an inductance of 34.6 nH and a capacitance of 13.6 pF, and has the phase shift characteristic shown in FIG. 10.

Figure 10:
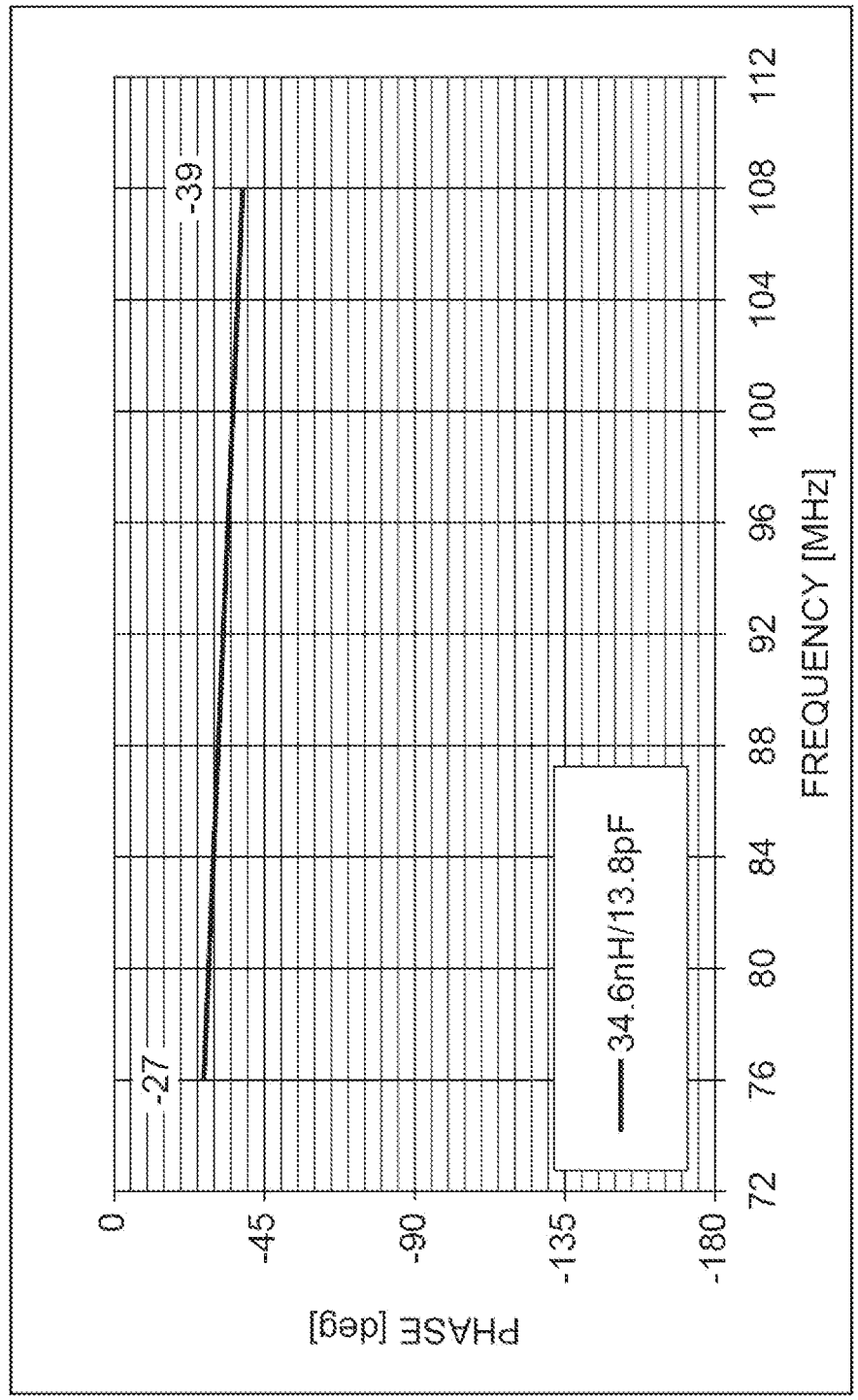
FIG. 10 is a diagram showing a phase shift characteristic of a phase difference absorption circuit used in the second arrangement example.

As shown in FIGS. 8 and 10, when a signal having a frequency of 76 MHz is input, the phase difference absorption circuit 20 outputs the signal after shifting the phase of the signal by −72° (=−45°−27°). In addition, when a signal having a frequency of 108 MHz is input, the phase difference absorption circuit 20 outputs the signal after shifting the phase of the signal by −102° (−63°−39°). The phase difference absorption circuit 20 is provided between the first antenna 12 and the combiner 22. As a result, the phase difference absorption circuit 20 changes the phase of the first signal S1 received by the first antenna 12 according to the phase shift characteristic.

In the second arrangement example, when a noise signal having a frequency of 76 MHz is output from the noise source N1, a phase shift of −91° occurs in the noise signal due to propagating through the first propagation path P1 (see FIG. 9), and a phase shift of −72° (=45°−27°) occurs in the noise signal due to passing through the phase difference absorption circuit 20 (see FIGS. 8 and 10). As a result, a phase shift of −163° occurs in this signal. On the other hand, when a noise signal having a frequency of 108 MHz is output from the noise source N1, a phase shift of −130° occurs in the noise signal due to passing through the space propagation path 31 (see FIG. 9), and a phase shift of −102° (=−63°−39°) occurs in the noise signal due to passing through the phase difference absorption circuit 20 (see FIGS. 8 and 10). As a result, a phase shift of −232° occurs in this signal. As described above, the phase shift characteristic in which the phase shift characteristic of the first propagation path P1 and the phase shift characteristic of the phase difference absorption circuit 20 are combined matches the phase shift characteristic of the second propagation path P2. Therefore, the phase of the noise signal included in the first signal S1 that has passed through the first propagation path P1 and the phase difference absorption circuit 20 and the phase of the noise signal (second signal S2) that has passed through the second propagation path P2 are the same.

The first signal S1 phase-shifted by the phase difference absorption circuit 20 is input to the combiner 22. The combiner 22 inverts the phase of the second signal S2 and combines the first signal S1 output from the phase difference absorption circuit 20 and the phase-inverted second signal S2. Since the noise component of the first signal S1 and the second signal S2 are combined in opposite phases by this combination, the noise component included in the second signal S2 is removed from the first signal S1.

As described above, in the first arrangement example and the second arrangement example, the phase difference absorption circuit 20 changes the phase shift characteristic of the first propagation path P1 to make the changed phase shift characteristic of the first propagation path P1 and the phase shift characteristic of the second propagation path P2 match each other. In other words, the phase difference absorption circuit 20 has a phase shift characteristic that makes the phase difference θ1 and the phase difference θ2 be 0°. However, the phase difference absorption circuit 20 may have at least a phase shift characteristic that reduces the difference between the phase difference θ1 and the phase difference θ2. By reducing the difference between the phase difference θ1 and the phase difference θ2, the phase difference between the signal that has passed through the first propagation path P1 and the phase difference absorption circuit 20 and the signal that has propagated through the second propagation path P2 can be made almost constant in the entire frequency band of the broadcast wave. In other words, the slope of the changed phase shift characteristic of the first propagation path Pt and the slope of the phase shift characteristic of the second propagation path P2 can be set to values close to each other. In this case, the two signals can be made to have the same phase by using a phase shifter that causes a phase shift by an angle corresponding to the phase difference.

In addition, in the first arrangement example and the second arrangement example, since the first in-band phase deviation D1 is smaller than the second in-band phase deviation D2, the phase difference absorption circuit 20 is provided between the first antenna 12 and the combiner 22. However, when the first in-band phase deviation D1 is larger than the second in-band phase deviation D2, the phase difference absorption circuit 20 may be provided between the second antenna 14 and the combiner 22. In this case, the phase difference absorption circuit 20 shifts the phase of the second signal S2 by an angle corresponding to the frequency.

Second Embodiment

Figure 11:
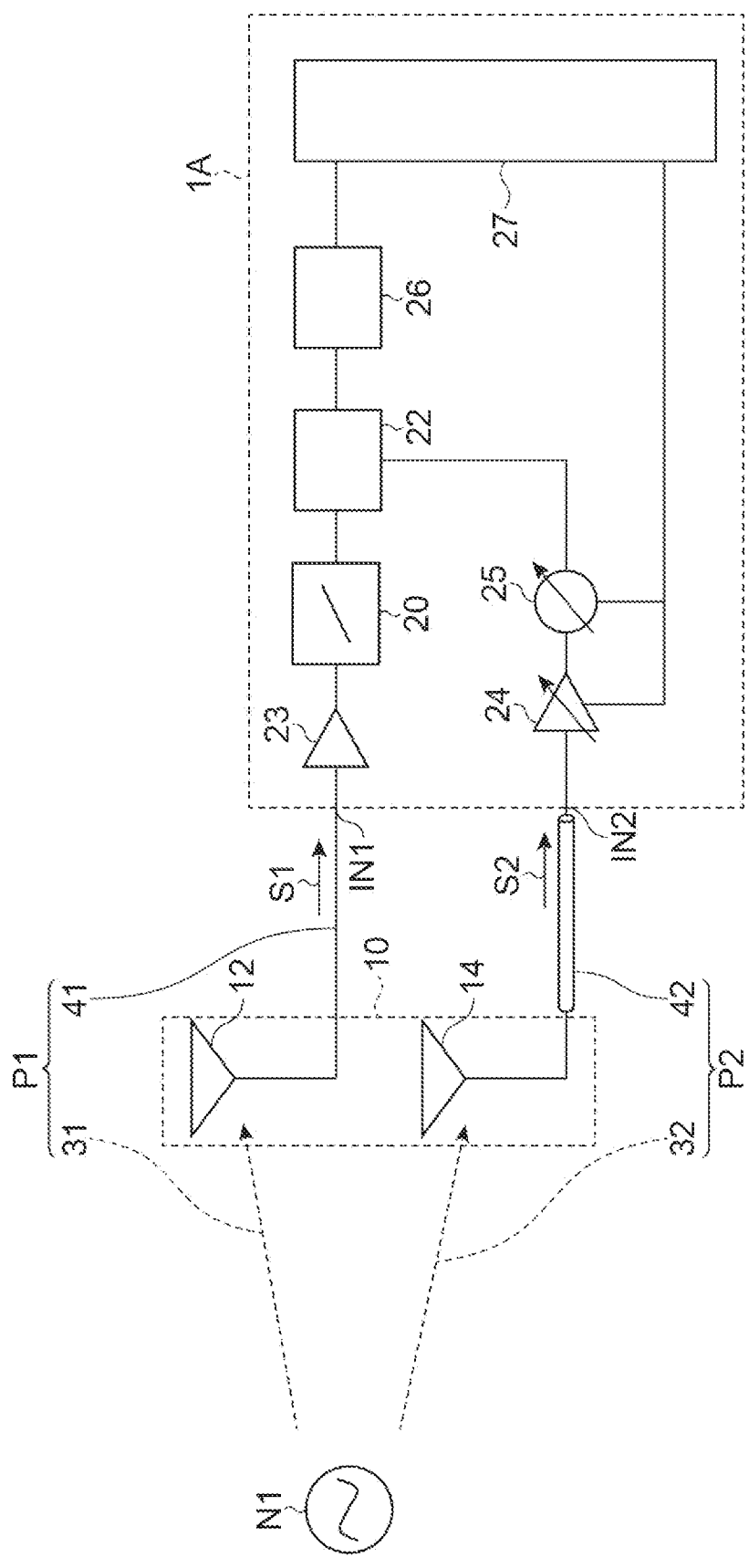
FIG. 11 is a diagram showing the functional configuration of a noise reduction device according to a second embodiment.

Next, a noise reduction device according to a second embodiment will be described. FIG. 11 is a diagram showing the functional configuration of a noise reduction device 1A according to the second embodiment. Hereinafter, the differences from the noise reduction device 1 according to the first embodiment described above will be mainly described, and repeated description thereof will be omitted.

The noise reduction device 1A is different from the noise reduction device 1 in that an amplifier 23, an amplitude changer 24, a phase changer 25, a receiving circuit 26, and a control unit 27 are further provided. The amplifier 23 is provided between the first antenna 12 and the phase difference absorption circuit 20, and has a function of amplifying the amplitude of the first signal S1 received by the first antenna 12. In addition, if the first antenna 12 has a sufficient gain, the noise reduction device 1A may not include the amplifier 23.

The amplitude changer 24 and the phase changer 25 are provided between the second antenna 14 and the combiner 22. The amplitude changer 24 has a function of amplifying the amplitude of the second signal S2 received by the second antenna 14 and outputting the amplified second signal S2 to the phase changer 25. The phase changer 25 has a function of shifting (changing) the phase of the second signal S2 output from the amplitude changer 24 and outputting the phase-shifted second signal S2 to the combiner 22. The amplitude changer 24 and the phase changer 25 are connected to the control unit 27, so that the amplitude amplification factor of the amplitude changer 24 and the phase shift amount by the phase changer 25 can be changed according to the control signal from the control unit 27. In addition, in one embodiment, the amplitude changer 24 and the phase changer 25 may be provided between the first antenna 12 and the combiner 22.

The receiving circuit 26 has an amplifier and a bandpass filter. The receiving circuit 26 receives an output signal from the combiner 22, and amplifies the received output signal and allows only a signal in the frequency band of the broadcast wave to pass therethrough. The control unit 27 acquires a signal obtained as a result of combination by the combiner 22 from the receiving circuit 26, and demodulates the output signal to detect the signal-to-noise ratio (SN ratio). Then, the control unit 27 transmits a control signal to the amplitude changer 24 and the phase changer 25 so that the power of the demodulated noise signal is reduced, thereby adjusting the amplification factor of the amplitude changer 24 and the phase shift amount by the phase changer 25.

In the noise reduction device 1A, since the amplitude changer 24 and the phase changer 25 are controlled so that the power of the noise included in the signal obtained as a result of combination by the combiner 22 is reduced, it is possible to further reduce the noise component of the first signal S1. In the noise reduction device 1A, since the phase difference between the first signal S1 and the second signal S2 is reduced by the phase difference absorption circuit 20 and the combiner 22, it is possible to reduce the control range of the amplification factor and the phase shift amount by the control unit 27. As a result, it is possible to reduce the calculation load for the control.

Third Embodiment

Figure 12:
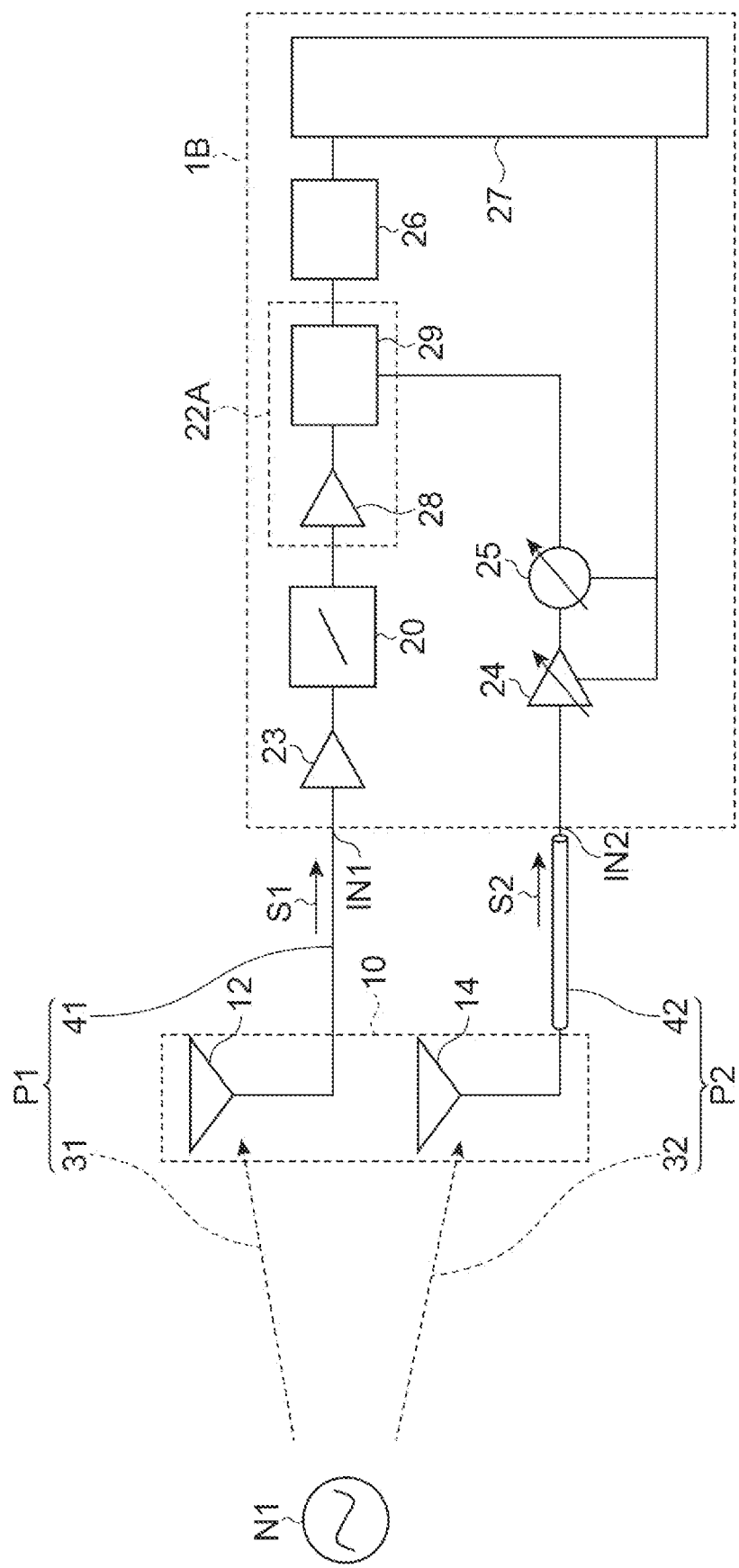
FIG. 12 is a diagram showing the functional configuration of a noise reduction device according to a third embodiment.

Next, a noise reduction device according to a third embodiment will be described. FIG. 12 is a diagram showing the functional configuration of a noise reduction device 1B according to the third embodiment. Hereinafter, the differences from the noise reduction device 1A according to the second embodiment described above will be mainly described, and repeated description thereof will be omitted.

The noise reduction device 1B shown in FIG. 12 is mainly used to remove noise from the AM signal received by the first antenna 12. The noise reduction device 1B includes a combiner 22A instead of the combiner 22.

Figure 13:
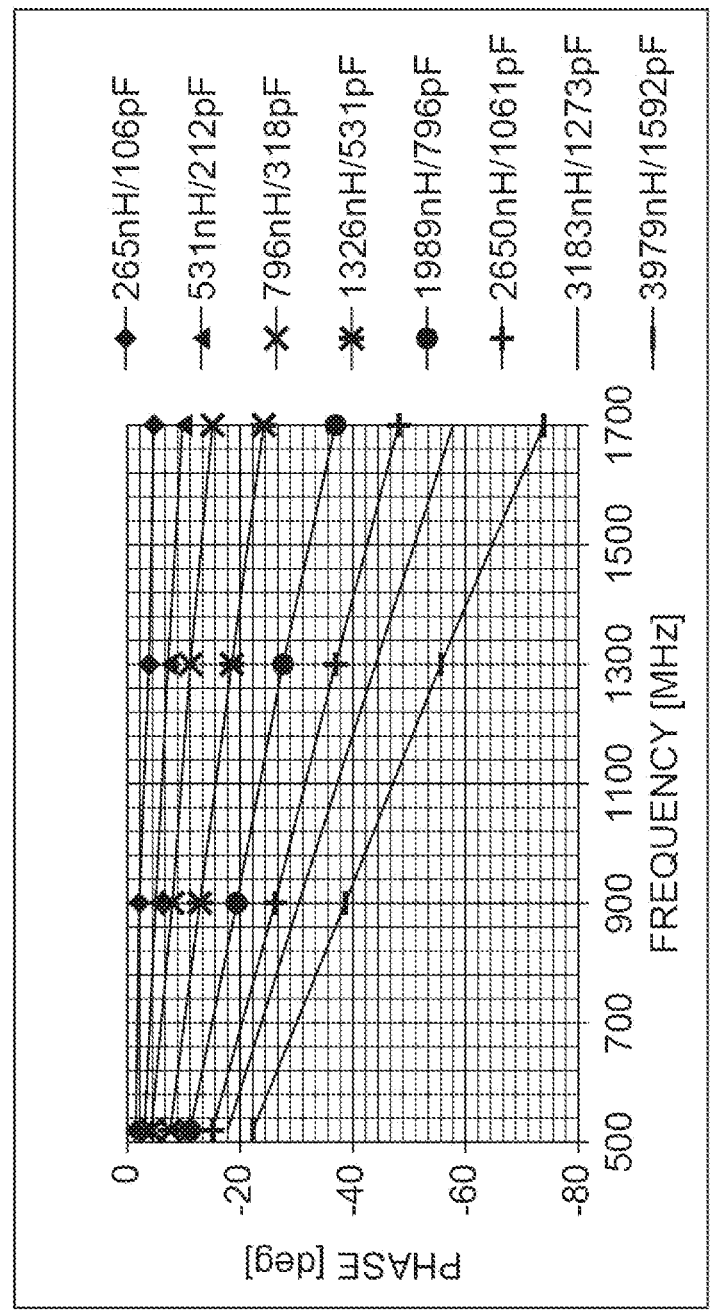
FIG. 13 is a diagram showing an example of a phase shift characteristic of a phase difference absorption circuit.

In addition, the phase difference absorption circuit 20 of the present embodiment has a phase shift characteristic corresponding to the frequency band of the AM signal. FIG. 13 shows an example of the phase shift characteristic of the phase difference absorption circuit 20 used in the present embodiment. By providing such a phase difference absorption circuit 20, the phase of the noise component of the first signal S1 that has passed through the first propagation path P1 and the phase difference absorption circuit 20 and the phase of the second signal S2 that has passed through the second propagation path P2 can be the same.

As shown in FIG. 12, the combiner 22A includes a phase inverter 28 and an adder 29. The phase inverter 28 is provided after the phase difference absorption circuit 20 and inverts the phase of the output signal of the phase difference absorption circuit 20 and outputs a phase-inverted signal to the adder 29. The adder 29 is an adder using an operational amplifier or the like. The adder 29 adds up the first signal S1 phase-inverted by the phase inverter 28 and the second signal S2. In this manner, the combiner 22A adds up the noise component of the first signal S1 and the second signal S2 in opposite phases. As a result, the noise component is removed from the first signal S1.

According to the noise reduction device 1B of the present embodiment, the noise included in the first signal S1 can be reduced as in the noise reduction devices 1 and 1A. In addition, since the combiner 22A combines the first signal S1 and the second signal S2 by using the adder 29 that can be configured by a simple circuit, the size of the combiner 22A can be smaller than that of the combiner 22. Therefore, the noise reduction device 1B can be made small.

In addition, in the embodiment shown in FIG. 12, the phase of the first signal S1 output from the phase difference absorption circuit 20 is inverted. However, the phase inverter 28 may be provided between the adder 29 and the second antenna 14 in order to invert the phase of the second signal S2 and output the phase-inverted second signal S2 to the adder 29. In this case, the adder 29 adds up the first signal S1 output from the phase difference absorption circuit 20 and the second signal S2 phase-inverted by the phase inverter 28.

Fourth Embodiment

Figure 14:
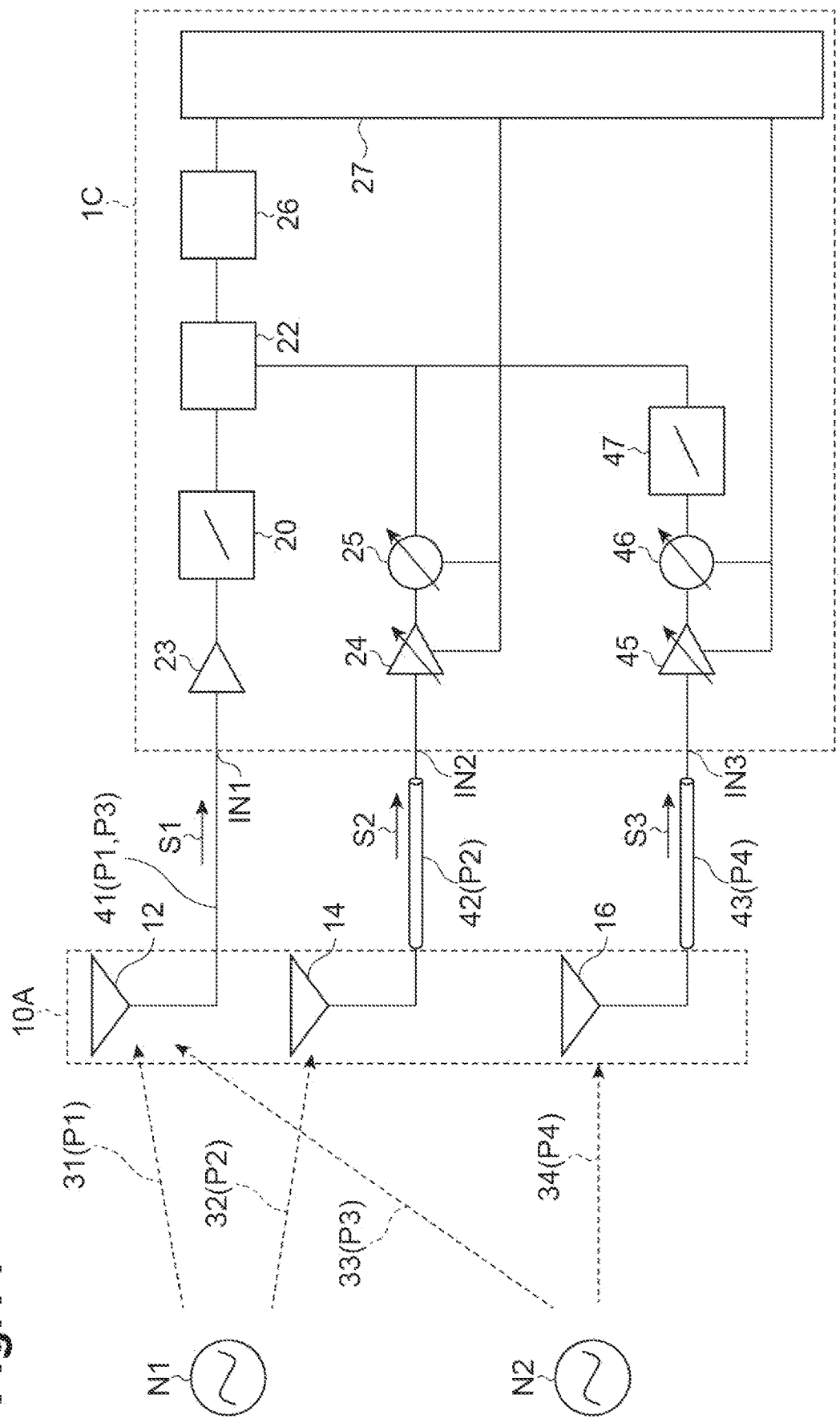
FIG. 14 is a diagram showing the functional configuration of a noise reduction device according to a fourth embodiment.

Next, a noise reduction device according to a fourth embodiment will be described. FIG. 14 is a diagram showing the functional configuration of a noise reduction device 1C according to the fourth embodiment. Hereinafter, the differences from the noise reduction device 1A according to the second embodiment described above will be mainly described, and repeated description thereof will be omitted.

As shown in FIG. 14, the noise reduction device 1C is connected to an in-vehicle antenna device 10A including a first antenna 12, a second antenna 14, and a third antenna 16. The first antenna 12 is an antenna for receiving a broadcast wave, and the second antenna 14 and the third antenna 16 are antennas for receiving noise signals from a noise source N1 and a noise source N2, respectively.

The first antenna 12 receives noise signals output from the noise source N1 and the noise source N2 together with a broadcast wave. As shown in FIG. 14, the noise signal output from the noise source N1 propagates through a space propagation path 31 and is received by the first antenna 12, and the noise signal output from the noise source N2 propagates through a space propagation path 33 and is received by the first antenna 12. A first signal S1 including the broadcast wave signal received by the first antenna 12 and the noise signals from the noise source N1 and the noise source N2 is input to an input terminal IN1 of the noise reduction device 1C through a conducting wire propagation path 41.

In addition, the noise signal output from the noise source N1 propagates through a space propagation path 32 and is also received by the second antenna 14. A second signal S2 received by the second antenna 14 is input to an input terminal IN2 of the noise reduction device 1C through a conducting wire propagation path 42. In addition, the noise signal output from the noise source N2 propagates through a space propagation path 34 and is also received by the third antenna 16. A third signal S3 received by the third antenna 16 is input to an input terminal IN3 of the noise reduction device 1C through a conducting wire propagation path 43.

The noise reduction device 1C removes a noise component caused by the noise source N1 from the first signal S1 by combining the first signal S1 received by the first antenna 12 and the second signal S2 received by the second antenna 14 in opposite phases. In addition, the noise reduction device 1C removes a noise component caused by the noise source N2 from the first signal S1 by combining the first signal S1 received by the first antenna 12 and the third signal S3 received by the third antenna 16 in opposite phases.

As shown in FIG. 14, in the noise reduction device 1C according to the present embodiment, an amplitude changer 45, a phase changer 46, and a phase difference absorption circuit 47 are provided between the third antenna 16 and the combiner 22. The amplitude changer 45 amplifies the amplitude of the third signal S3 received by the third antenna 16 and outputs the amplified third signal S3 to the phase changer 46. The phase changer 46 shifts the phase of the third signal S3 output from the amplitude changer 45 and outputs the phase-shifted third signal S3 to the phase difference absorption circuit 47. The phase difference absorption circuit 47 shifts the phase of the third signal S3 by an angle corresponding to the frequency.

Figure 15:
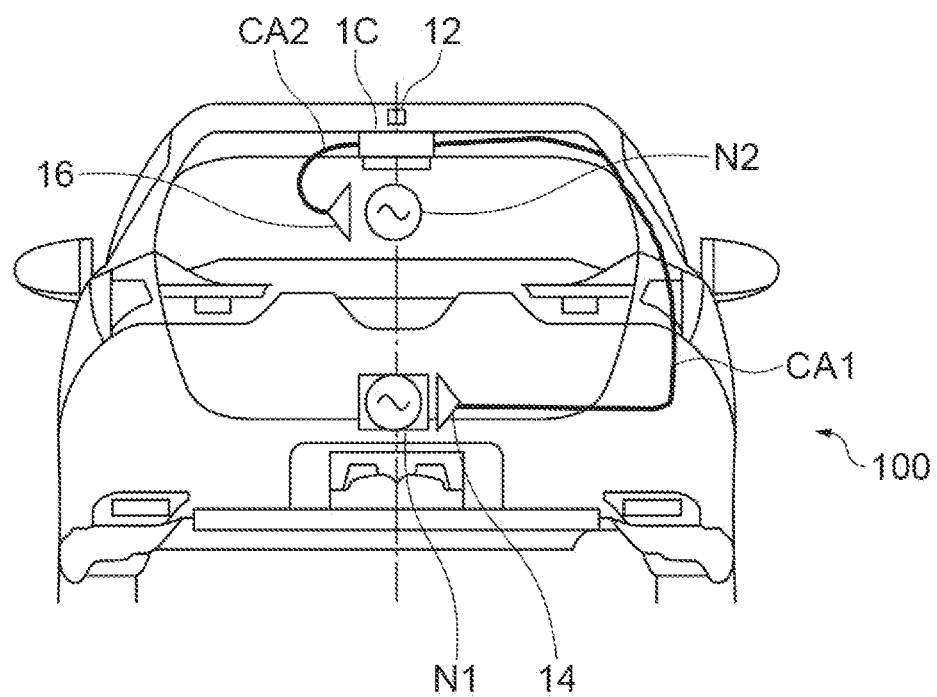
FIG. 15 is a diagram showing a third arrangement example of the noise reduction device.

Hereinafter, the functional configuration of the noise reduction device 1C will be described in more detail based on a specific example. FIG. 15 shows a third arrangement example of the noise reduction device 1C attached to the vehicle 100.

In the third arrangement example, the first antenna 12 is mounted on the roof panel of the vehicle 100. The second antenna 14 is disposed in the vicinity of the noise source N1 of the vehicle 10. An inverter is exemplified as the noise source N1, but the noise source N1 is not limited thereto. The third antenna 16 is disposed in the vicinity of the noise source N2 of the vehicle 100. A rear camera for capturing the rear side of the vehicle 100 is exemplified as the noise source N2, but the noise source N2 is not limited thereto.

The noise reduction device 1C is electrically connected to the first antenna 12, the second antenna 14, and the third antenna 16. In this arrangement example, the noise reduction device 1C is disposed in the vicinity of the first antenna 12. In addition, the noise reduction device 1C is disposed so as to be separated from the second antenna 14, and the noise reduction device 1C and the second antenna 14 are connected to each other by a coaxial cable CA1. The length of the coaxial cable CA1 is assumed to be 2 m.

In addition, the noise reduction device 1C is disposed so as to be separated from the third antenna 16, and the noise reduction device 1C and the third antenna 16 are connected to each other by a coaxial cable CA2. The length of the coaxial cable CA2 is assumed to be 0.2 m.

In the third arrangement example, it is assumed that the separation distance between the noise source N1 and the first antenna 12 is 1 m. Therefore, the propagation path length of the space propagation path 31 is 1 m. In addition, it is assumed that the separation distance between the noise source N2 and the first antenna 12 is 0.02 m. Therefore, the propagation path length of the space propagation path 33 is 0.02 m. On the other hand, since the second antenna 14 and the third antenna 16 are disposed in the vicinity of the noise source N1 and the noise source N2, respectively, the propagation path lengths of the space propagation path 32 and the space propagation path 34 can be ignored.

In addition, since the noise reduction device 1C is disposed in the vicinity of the first antenna 12, the propagation path length of the conducting wire propagation path 41 can be ignored. Since the second antenna 14 and the noise reduction device 1C are connected to each other by the coaxial cable CA1 of 2 m, the propagation path length of the conducting wire propagation path 42 is 2 m. Since the third antenna 16 and the noise reduction device 1C are connected to each other by the coaxial cable CA2 of 0.2 m, the propagation path length of the conducting wire propagation path 43 is 0.2 m. In addition, it is assumed that the propagation path length between the input terminal IN1 and the combiner 22, the propagation path length between the input terminal IN2 and the combiner 22, and the propagation path length between the input terminal IN3 and the combiner 22 are the same.

In the third arrangement example, the noise signal output from the noise source N1 propagates through the space propagation path 31 and the conducting wire propagation path 41 and is input to the input terminal IN1 of the noise reduction device 1C. Here, assuming that the path of the signal that reaches the input terminal IN1 of the noise reduction device 1C from the noise source N1 through the first antenna 12 is a first propagation path P1, the first propagation path P1 has a space propagation path 31 of 1 m and a conducting wire propagation path 41 of substantially 0 m. The phase shift characteristic of the first propagation path P1 is a combination of the phase shift characteristic of the space propagation path 31 and the phase shift characteristic of the conducting wire propagation path 41.

In addition, the noise wave output from the noise source N1 propagates through the space propagation path 32 and the conducting wire propagation path 42 and is input to the input terminal IN2 of the noise reduction device 1C. Here, assuming that the path of the signal that reaches the input terminal IN2 of the noise reduction device 1C from the noise source N1 through the second antenna 14 is a second propagation path P2, the second propagation path P2 has a space propagation path 32 of substantially 0 m and a conducting wire propagation path 42 of 2 m. The phase shift characteristic of the second propagation path P2 is a combination of the phase shift characteristic of the space propagation path 32 and the phase shift characteristic of the conducting wire propagation path 42.

Figure 16:
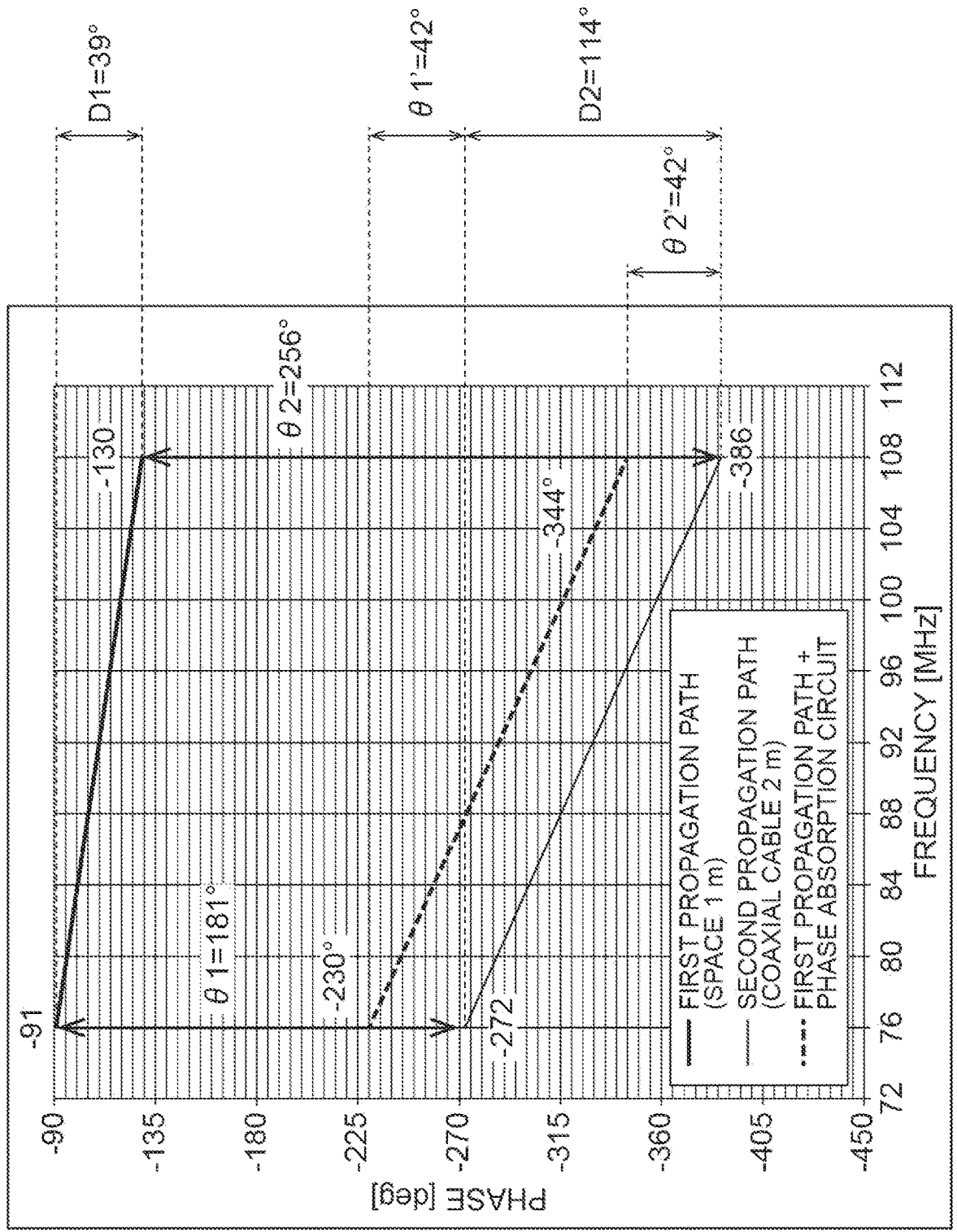
FIG. 16 is a diagram showing a phase shift characteristic of a first propagation path and a second propagation path in a third arrangement example.

FIG. 16 shows the phase shift characteristics of the first propagation path P1 and the second propagation path P2 according to the third arrangement example. As shown in FIG. 16, when a signal having a frequency of 76 MHz passes through the first propagation path P1, a phase shift of −91° occurs in the signal. On the other hand, when a signal having a frequency of 108 MHz passes through the first propagation path P1, a phase shift of 130° occurs in the signal. Here, the first in-band phase deviation D1 indicating the difference between the phase shift amount when the signal having a frequency of 76 MHz passes through the first propagation path P1 and the phase shift amount when the signal having a frequency of 108 MHz passes through the first propagation path P1 is 39°.

In addition, when a signal having a frequency of 76 MHz passes through the second propagation path P2, a phase shift of −272° occurs in the signal. On the other hand, when a signal having a frequency of 108 MHz passes through the second propagation path P2, a phase shift of −386° occurs in the signal. Here, the second in-band phase deviation D2 indicating the difference between the phase shift amount when the signal having a frequency of 76 MHz passes through the second propagation path P2 and the phase shift amount when the signal having a frequency of 108 MHz passes through the second propagation path P2 is 114°.

In addition, as shown in FIG. 16, the phase difference θ1 between two signals having a frequency of 76 MHz that have passed through the first propagation path P1 and the second propagation path P2, respectively, from the noise source N1 is 1810. On the other hand, the phase difference θ2 between two signals having a frequency of 108 MHz that have passed through the first propagation path P1 and the second propagation path P2, respectively, from the noise source N1 is 256°. The phase difference absorption circuit 20 of the noise reduction device 1C has a phase shift characteristic that reduces a difference between the phase difference θ1 and the phase difference θ2.

Figure 17:
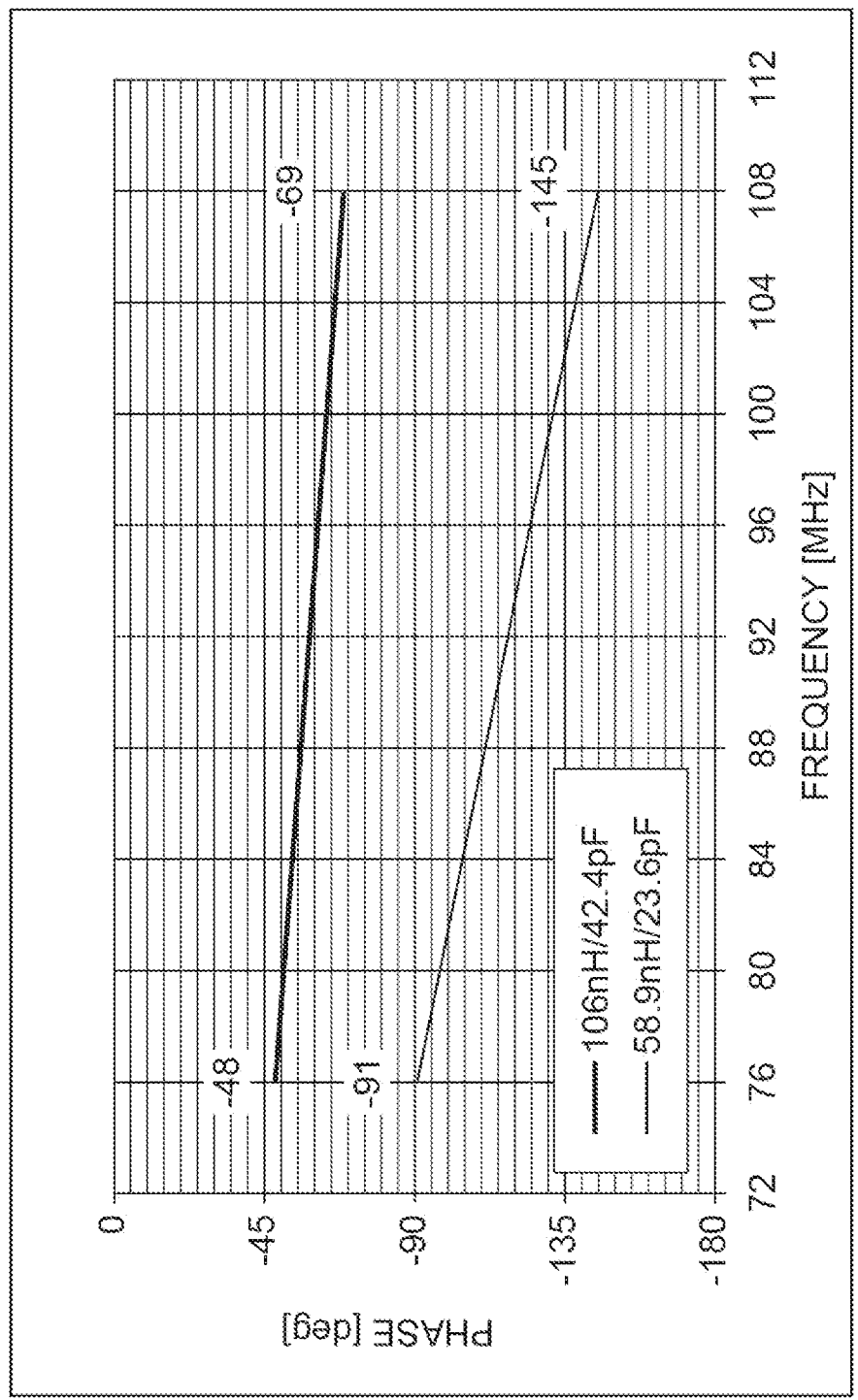
FIG. 17 is a diagram showing a phase shift characteristic of a phase difference absorption circuit used in the third arrangement example.

FIG. 17 shows the phase shift characteristic of the phase difference absorption circuit 20 used in the third arrangement example. The phase difference absorption circuit 20 has a two-stage configuration. The first stage portion of the phase difference absorption circuit 20 has an inductance of 106 nH and a capacitance of 42.4 pF. The second stage portion of the phase difference absorption circuit 20 has an inductance of 58.9 nH and a capacitance of 23.6 pF. As shown in FIG. 17, when a signal having a frequency of 76 MHz is input, the phase difference absorption circuit 20 outputs the signal after shifting the phase of the signal by −139° (=−48°−91°). In addition, when a signal having a frequency of 108 MHz is input, the phase difference absorption circuit 20 outputs the signal after shifting the phase of the signal by −214° (=−69°−145°). The phase difference absorption circuit 20 is provided between the first antenna 12 and the combiner 22. As a result, the phase difference absorption circuit 20 changes the phase of the first signal S1 received by the first antenna 12 according to the phase shift characteristic.

In the third arrangement example, when a signal having a frequency of 76 MHz is output from the noise source N1, a phase shift of −91° occurs in the noise signal due to propagating through the first propagation path P1, and a phase shift of −139° occurs in the noise signal due to passing through the phase difference absorption circuit 20. As a result, a phase shift of −230° occurs in this signal. On the other hand, when a noise signal having a frequency of 108 MHz is output from the noise source N1, a phase shift of −130° occurs in the noise signal due to passing through the space propagation path 31, and a phase shift of −214° occurs in the noise signal due to passing through the phase difference absorption circuit 20. As a result, a phase shift of −344° occurs in this signal.

As shown in FIG. 16, the phase shift characteristic obtained by combining the phase shift characteristic of the first propagation path P1 and the phase shift characteristic of the phase difference absorption circuit 20 has the same slope as the phase shift characteristic of the second propagation path P2. For example, when the frequency of the noise signals from the noise sources N1 and N2 is 76 MHz, a phase difference θ1' between the noise signal that has passed through the first propagation path P1 and the phase difference absorption circuit 20 and the noise signal that has passed through the second propagation path P2 is 42°. In addition, when the frequency of the noise signal is 108 MHz, a phase difference θ2' between the noise signal that has passed through the first propagation path P1 and the phase difference absorption circuit 20 and the noise signal that has passed through the second propagation path P2 is also 42°. That is, the phase difference absorption circuit 20 reduces the difference between the phase difference θ1' and the phase difference θ2'. As a result, the phase difference between the noise signal included in the first signal S1 that has passed through the first propagation path P1 and the phase difference absorption circuit 20 and the noise signal that has passed through the second propagation path becomes an approximately constant angle in the entire frequency band of the FM band.

In the third arrangement example, for example, the second signal S2 is phase-shifted by a constant angle of 42° by the phase changer 25. As a result, the phase of the noise component caused by the noise source N1 in the first signal S1 output from the phase difference absorption circuit 20 and the phase of the second signal S2 after the phase shift are the same in the entire frequency band of the broadcast wave. The phase-shifted second signal S2 is output to the combiner 22.

In addition, the noise signal output from the noise source N2 propagates through the space propagation path 33 and the conducting wire propagation path 41 and is input to the input terminal IN1 of the noise reduction device 1C. Here, assuming that the path of the signal that reaches the input terminal IN1 of the noise reduction device 1C from the noise source N2 through the first antenna 12 is a third propagation path P3, the third propagation path P3 has a space propagation path 33 of 0.02 m and a conducting wire propagation path 41 of substantially 0 m. The phase shift characteristic of the third propagation path P3 is a combination of the phase shift characteristic of the space propagation path 33 and the phase shift characteristic of the conducting wire propagation path 41. In addition, since the above-described phase difference absorption circuit 20 is provided between the input terminal IN1 and the combiner 22, the noise signal output from the noise source N2 is phase-shifted by the phase difference absorption circuit 20.

In addition, the noise wave output from the noise source N2 propagates through the space propagation path 34 and the conducting wire propagation path 43 and is input to the input terminal IN3 of the noise reduction device 1C. Here, assuming that the path of the signal that reaches the input terminal IN3 of the noise reduction device 1C from the noise source N2 through the third antenna 16 is a fourth propagation path P4, the fourth propagation path P4 has a space propagation path 34 of substantially 0 m and a conducting wire propagation path 43 of 0.2 m. The phase shift characteristic of the fourth propagation path P4 is a combination of the phase shift characteristic of the space propagation path 34 and the phase shift characteristic of the conducting wire propagation path 43.

Figure 18:
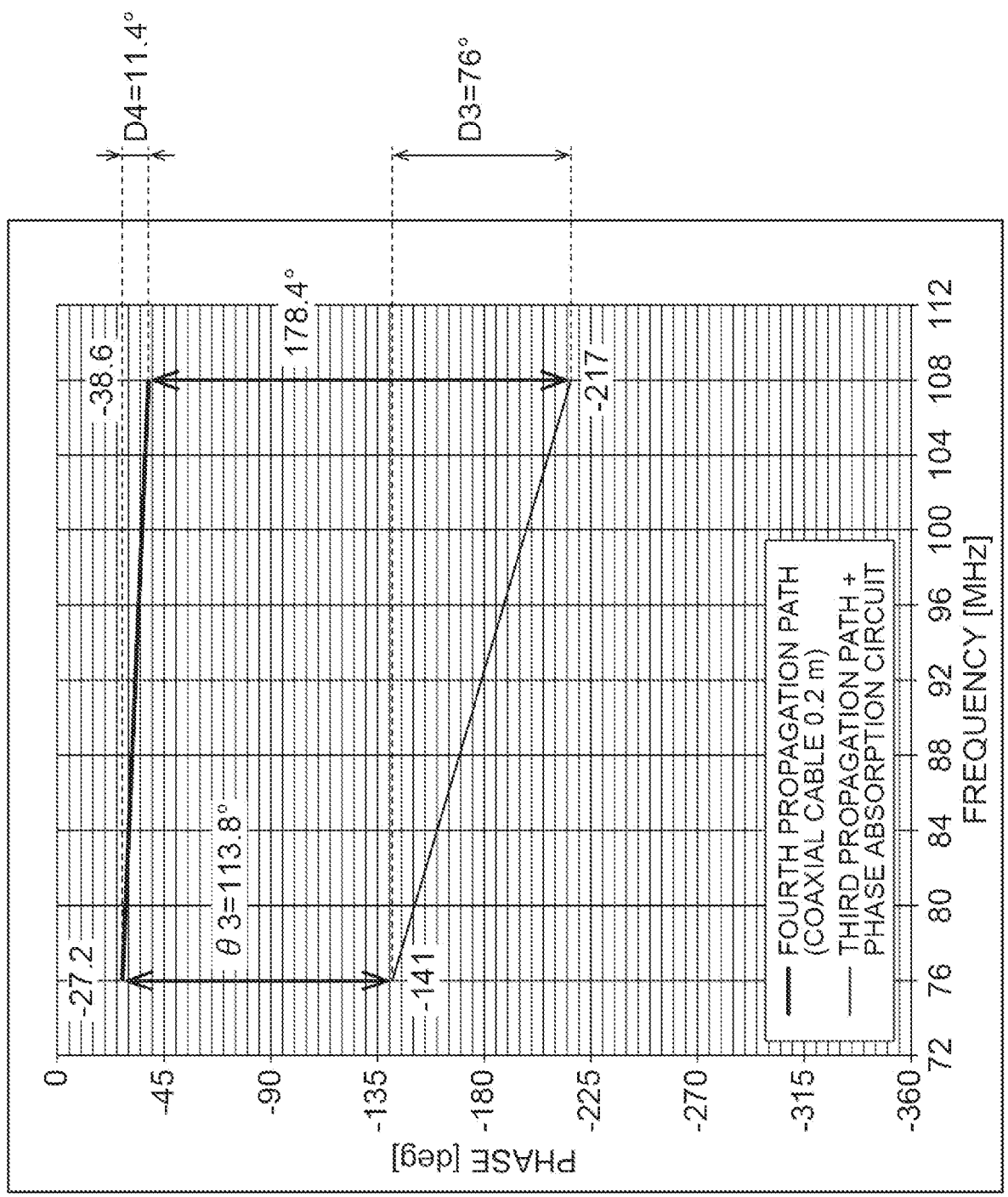
FIG. 18 is a diagram showing a phase shift characteristic in which a phase shift characteristic of a third propagation path and a phase shift characteristic of a phase difference absorption circuit are combined and a signal propagation characteristic of a fourth propagation path.

FIG. 18 shows the phase shift characteristic obtained by combining the phase shift characteristic of the third propagation path P3 and the phase shift characteristic of the phase difference absorption circuit 20 and the phase shift characteristic of the fourth propagation path P4. As shown in FIG. 18, when a signal having a frequency of 76 MHz passes through the third propagation path P3 and the phase difference absorption circuit 20, a phase shift of −141° occurs in the signal. On the other hand, when a signal having a frequency of 108 MHz passes through the third propagation path P3 and the phase difference absorption circuit 20, a phase shift of −217° occurs in the signal. Here, a third in-band phase deviation D3 indicating the difference between the phase shift amount when the signal having a frequency of 76 MHz passes through the third propagation path P3 and the phase difference absorption circuit 20 and the phase shift amount when the signal having a frequency of 108 MHz passes through the third propagation path P3 and the phase difference absorption circuit 20 is 76°.

In addition, when a signal having a frequency of 76 MHz passes through the fourth propagation path P4, a phase shift of −27.2° occurs in the signal. On the other hand, when a signal having a frequency of 108 MHz passes through the fourth propagation path P4, a phase shift of −38.6° occurs in the signal. Here, the fourth in-band phase deviation D4 indicating the difference between the phase shift amount when the signal having a frequency of 76 MHz passes through the fourth propagation path P4 and the phase shift amount when the signal having a frequency of 108 MHz passes through the fourth propagation path P4 is 11.4°.

In addition, as shown in FIG. 18, when the frequency of the noise signal is 76 MHz, a phase difference θ3 between the noise signal that has passed through the third propagation path P3 and the phase difference absorption circuit 20 and the noise signal that has passed through the fourth propagation path P4 is 113.8°, and when the frequency of the noise signal is 108 MHz, a phase difference θ4 between the noise signal that has passed through the third propagation path P3 and the phase difference absorption circuit 20 and the noise signal that has passed through the fourth propagation path P4 is 178.4°. The phase difference absorption circuit 47 of the noise reduction device 1C has a phase shift characteristic that reduces a difference between the phase difference θ3 and the phase difference θ4.

Figure 19:
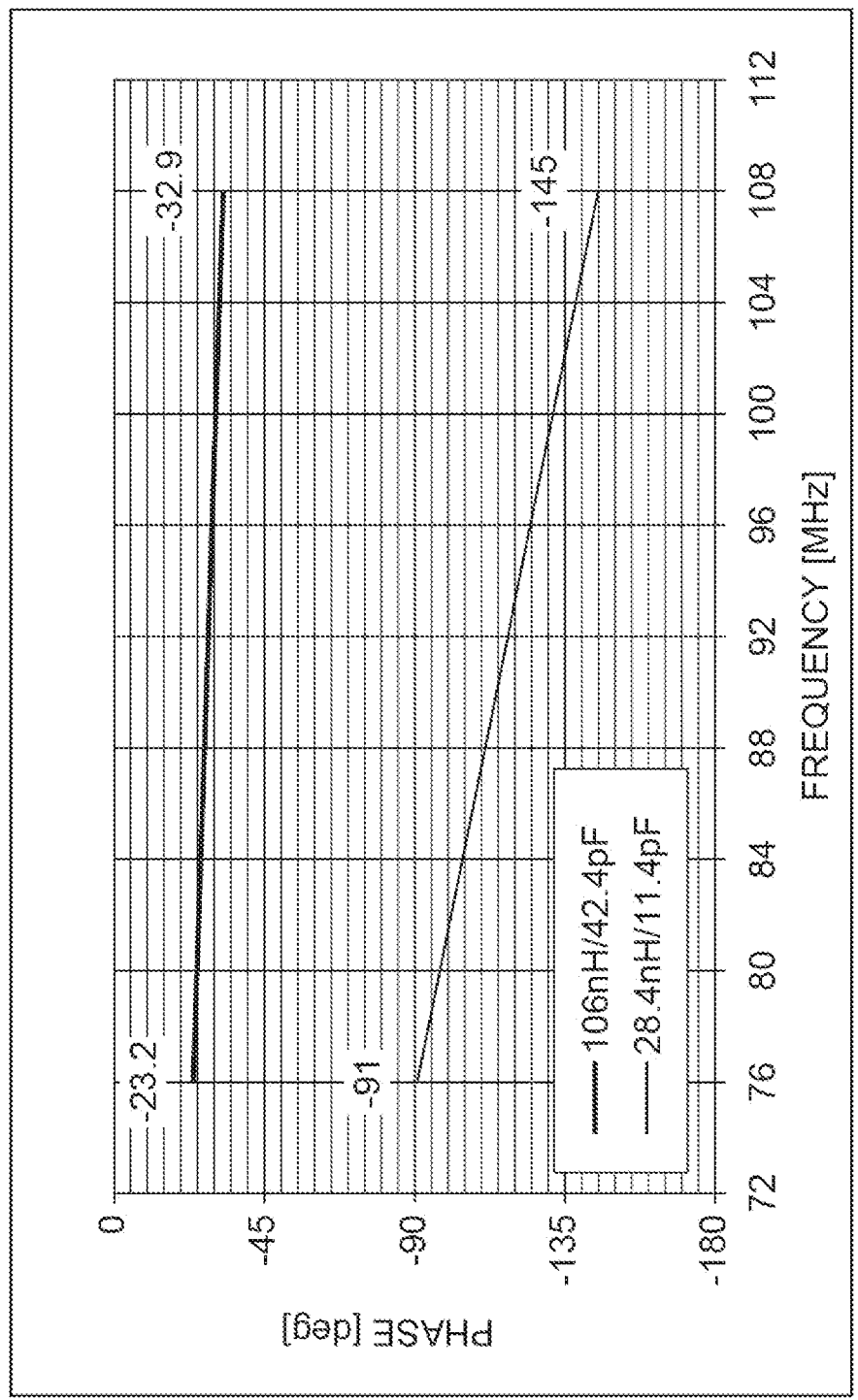
FIG. 19 is a diagram showing a phase shift characteristic of a phase difference absorption circuit used in the third arrangement example.

FIG. 19 shows the phase shift characteristic of the phase difference absorption circuit 47 used in the third arrangement example. The phase difference absorption circuit 47 has a two-stage configuration. The first stage portion of the phase difference absorption circuit 47 has an inductance of 106 nH and a capacitance of 42.4 pF. The second stage portion of the phase difference absorption circuit 47 has an inductance of 28.4 nH and a capacitance of 11.4 pF. As shown in FIG. 19, when a signal having a frequency of 76 MHz is input, the phase difference absorption circuit 47 outputs the signal after shifting the phase of the signal by −114.2° (=−91°−23.2°). In addition, when a signal having a frequency of 108 MHz is input, the phase difference absorption circuit 20 outputs the signal after shifting the phase of the signal by −177.9° (=−145°−32.9°). The phase difference absorption circuit 47 is provided between the third antenna 16 and the combiner 22. As a result, the phase difference absorption circuit 47 changes the phase of the third signal S3 received by the third antenna 16 according to the phase shift characteristic.

As described above, in the third arrangement example, the noise signal output from the noise source N2 is received by the third antenna 16. For example, when a noise signal having a frequency of 76 MHz is output from the noise source N2, a phase shift of −27.2° occurs in the noise signal due to propagating through the fourth propagation path P4, and a phase shift of −114.2° occurs in the noise signal due to passing through the phase difference absorption circuit 47. As a result, a phase shift of −141° occurs in this signal. On the other hand, when a noise signal having a frequency of 108 MHz is output from the noise source N2, a phase shift of −38.6° occurs in the noise signal due to propagating through the fourth propagation path P4, and a phase shift of −177.9° occurs in the noise signal due to passing through the phase difference absorption circuit 47. As a result, a phase shift of −217° occurs in this signal. That is, the phase shift characteristic in which the phase shift characteristic of the third propagation path P3 and the phase shift characteristic of the phase difference absorption circuit 20 are combined matches the phase shift characteristic in which the phase shift characteristic of the fourth propagation path P4 and the phase of the phase difference absorption circuit 47 are combined. Therefore, the noise signal included in the first signal S1 that has passed through the third propagation path P3 and the phase difference absorption circuit 20 and the noise signal that has passed through the fourth propagation path P4 and the phase difference absorption circuit 47 have the same phase.

The combiner 22 inverts the phases of the second signal S2 and the third signal S3, and combines the first signal S1 output from the phase difference absorption circuit 20, the phase-inverted second signal S2, and the phase-inverted third signal S3. By this combination, the noise component caused by the noise source N1 included in the first signal S1 and the second signal S2 are combined in opposite phases, and the noise component caused by the noise source N2 included in the first signal S1 and the third signal S3 are combined in opposite phases. As a result, the noise components caused by the noise sources N1 and N2 are removed from the first signal S1.

Fifth Embodiment

Figure 20:
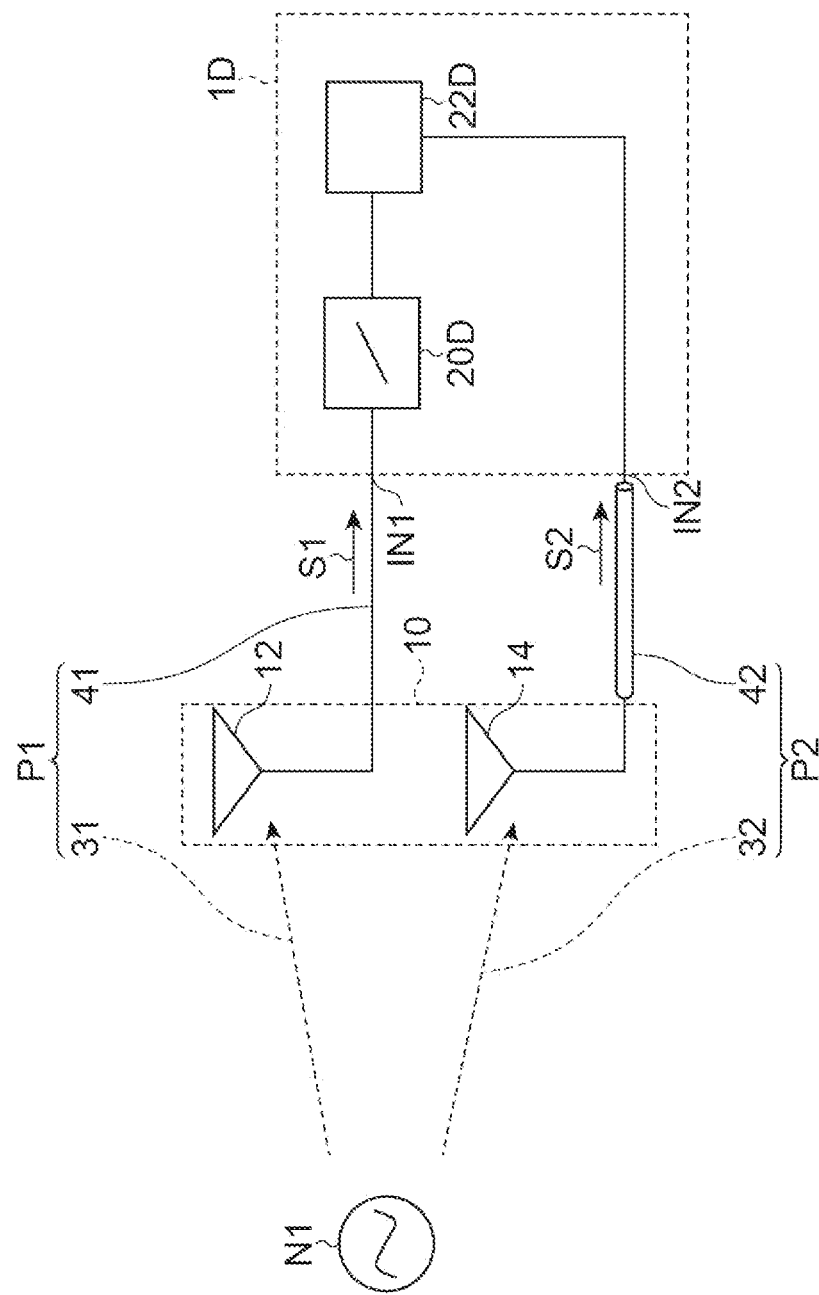
FIG. 20 is a diagram showing the functional configuration of a noise reduction device according to a fifth embodiment.

Next, a noise reduction device according to a fifth embodiment will be described. FIG. 20 is a diagram showing the functional configuration of a noise reduction device 1D according to the fifth embodiment. Hereinafter, the differences from the noise reduction device 1 according to the first embodiment described above will be mainly described, and repeated description thereof will be omitted.

The noise reduction device 1D includes a phase difference absorption circuit 20D and a combiner 22D instead of the phase difference absorption circuit 20 and the combiner 22. The phase difference absorption circuit 20D is different from the above-described phase difference absorption circuit 20 in that the phase of the first signal S1 is advanced by an angle corresponding to the frequency.

Hereinafter, the functional configuration of the noise reduction device 1D will be described in more detail based on a specific example. First, the noise reduction device 1D according to a fourth arrangement example will be described. In the fourth arrangement example, it is assumed that the first propagation path P1 has a space propagation path 31 having a propagation path length of 1 m and a conducting wire propagation path 41 having a propagation path length of substantially 0 m. In addition, it is assumed that the second propagation path P2 in the second arrangement example has a space propagation path 32 having a propagation path length of substantially 0 m and a conducting wire propagation path 42 having a propagation path length of 1.62 m.

Figure 21:
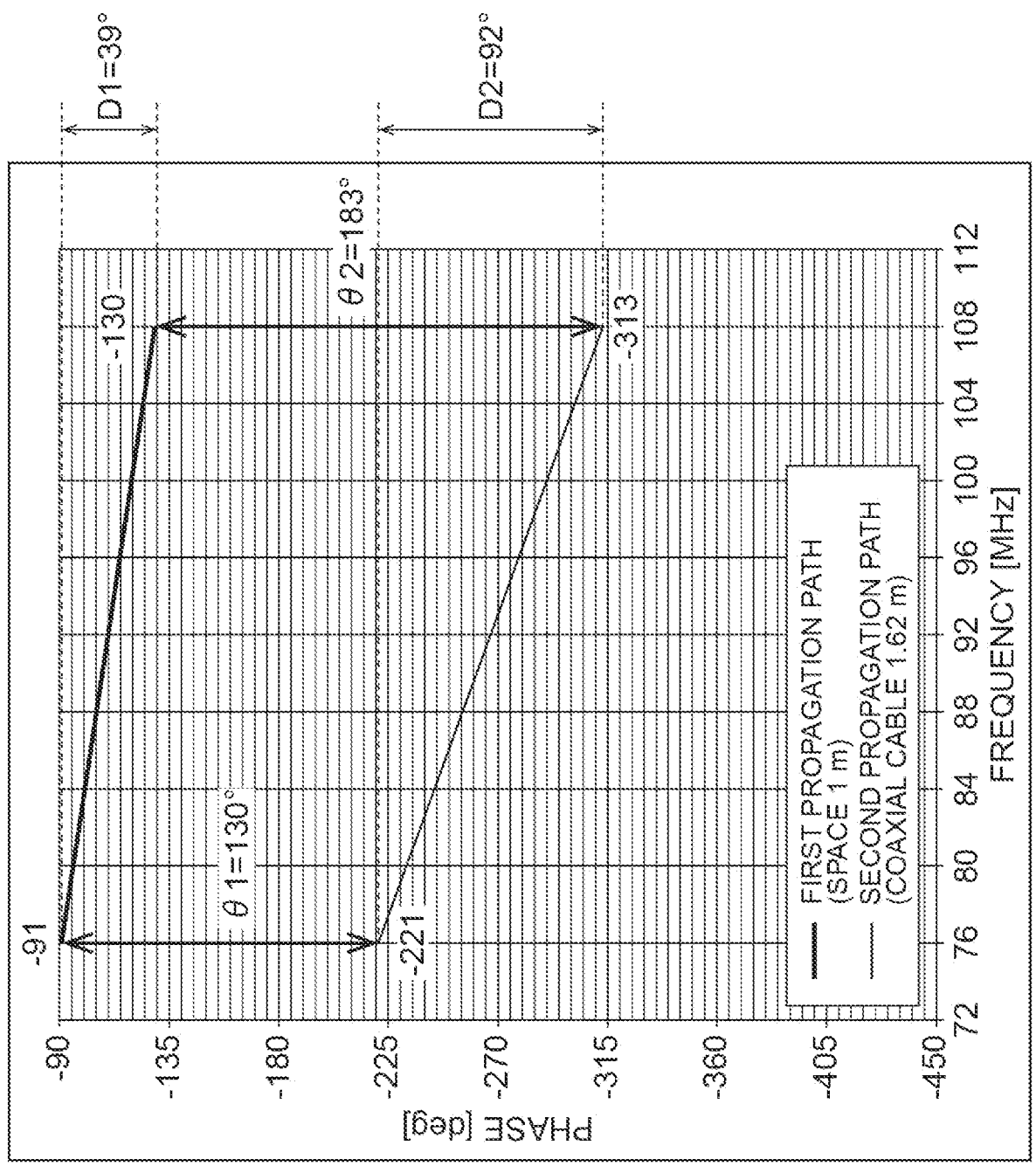
FIG. 21 is a diagram showing a phase shift characteristic of a first propagation path and a second propagation path in a fourth arrangement example.

FIG. 21 shows the phase shift characteristics of the first propagation path P1 and the second propagation path P2 in the fourth arrangement example. As shown in FIG. 21, when a signal having a frequency of 76 MHz passes through the first propagation path P1, a phase shift of −91° occurs in the signal. On the other hand, when a signal having a frequency of 108 MHz passes through the first propagation path P1, a phase shift of −130° occurs in the signal. Therefore, the first in-band phase deviation D1 indicating the difference between the phase shift amount when the signal having a frequency of 76 MHz passes through the first propagation path P1 and the phase shift amount when the signal having a frequency of 108 MHz passes through the first propagation path P1 is 39°.

On the other hand, when a signal having a frequency of 76 MHz passes through the second propagation path P2, a phase shift of −221° occurs in the signal. On the other hand, when a signal having a frequency of 108 MHz passes through the second propagation path P2, a phase shift of −313° occurs in the signal. Therefore, the second in-band phase deviation D2 indicating the difference between the phase shift amount when the signal having a frequency of 76 MHz passes through the second propagation path P2 and the phase shift amount when the signal having a frequency of 108 MHz passes through the second propagation path P2 is 92°.

As shown in FIG. 21, when two signals having a frequency of 76 MHz pass through the first propagation path P1 and the second propagation path P2, the phase difference θ1 between the two signals is 130°. On the other hand, when two signals having a frequency of 108 MHz pass through the first propagation path P1 and the second propagation path P2, the phase difference θ2 between the two signals is 183°. The phase difference absorption circuit 20D of the noise reduction device 1D has a phase shift characteristic that reduces a difference between the phase difference θ1 and the phase difference θ2.

Figure 22A:
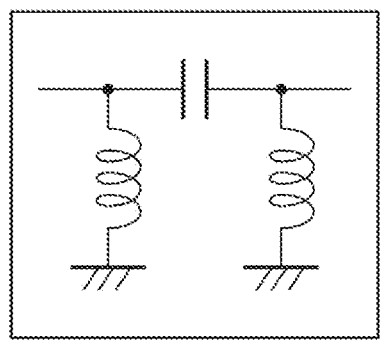
FIG. 22(a) to FIG. 22(d) are diagrams showing an example of the circuit configuration of a phase difference absorption circuit.
Figure 22B:
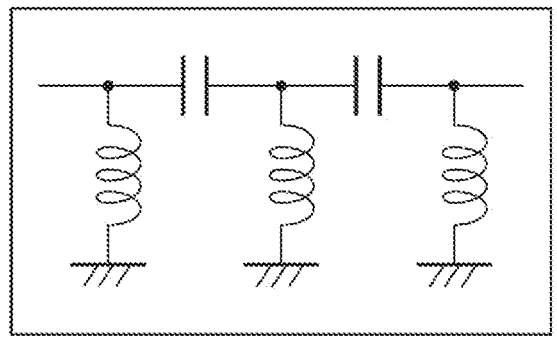
Figure 22C:
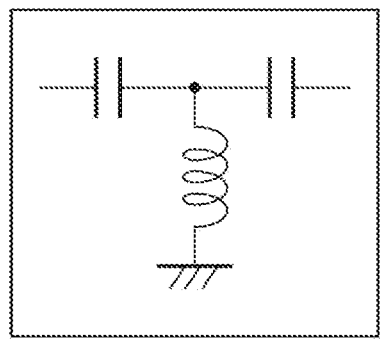
Figure 22D:
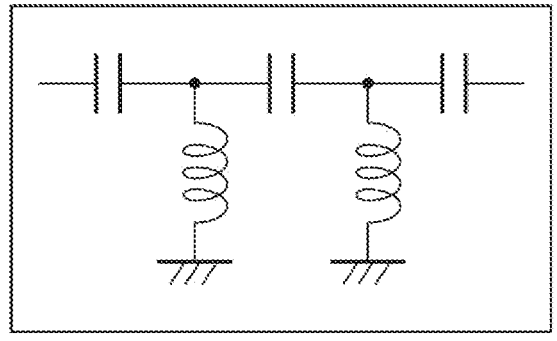
Figure 23:
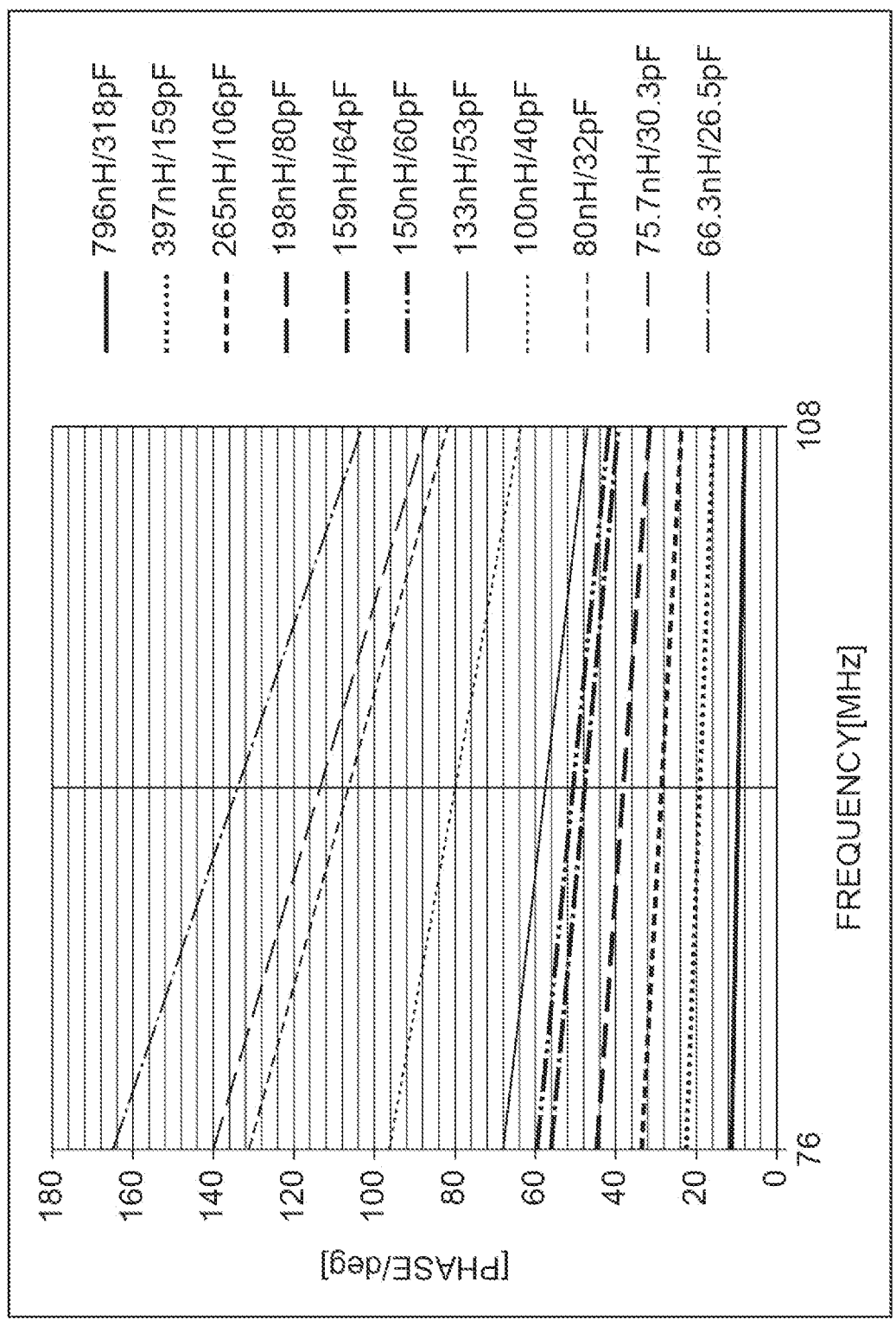
FIG. 23 is a diagram showing a phase shift characteristic of a phase difference absorption circuit.

FIG. 22(a) to 22(d) show an example of the circuit configuration of the phase difference absorption circuit 20D. As shown in FIGS. 22(a) to 22(d), the phase difference absorption circuit 20D includes an inductor and a capacitor. FIG. 22(a) shows the circuit configuration of the phase difference absorption circuit 20D according to the a-type one-stage configuration, and FIG. 22(b) shows the circuit configuration of the phase difference absorption circuit 20D according to the π-type two-stage configuration. In addition, FIG. 22(c) shows the circuit configuration of the phase difference absorption circuit 20D according to the T-type one-stage configuration, and FIG. 22(d) shows the circuit configuration of the phase difference absorption circuit 20D according to the T-type two-stage configuration. The phase difference absorption circuit 20D can obtain various phase shift characteristics by changing the inductance and the capacitance of circuit elements. FIG. 23 shows the phase shift characteristic of the phase difference absorption circuit 20D when the inductance and the capacitance of circuit elements are changed to various values. The phase difference absorption circuit 20D may have a circuit configuration of three or more stages.

Figure 24:
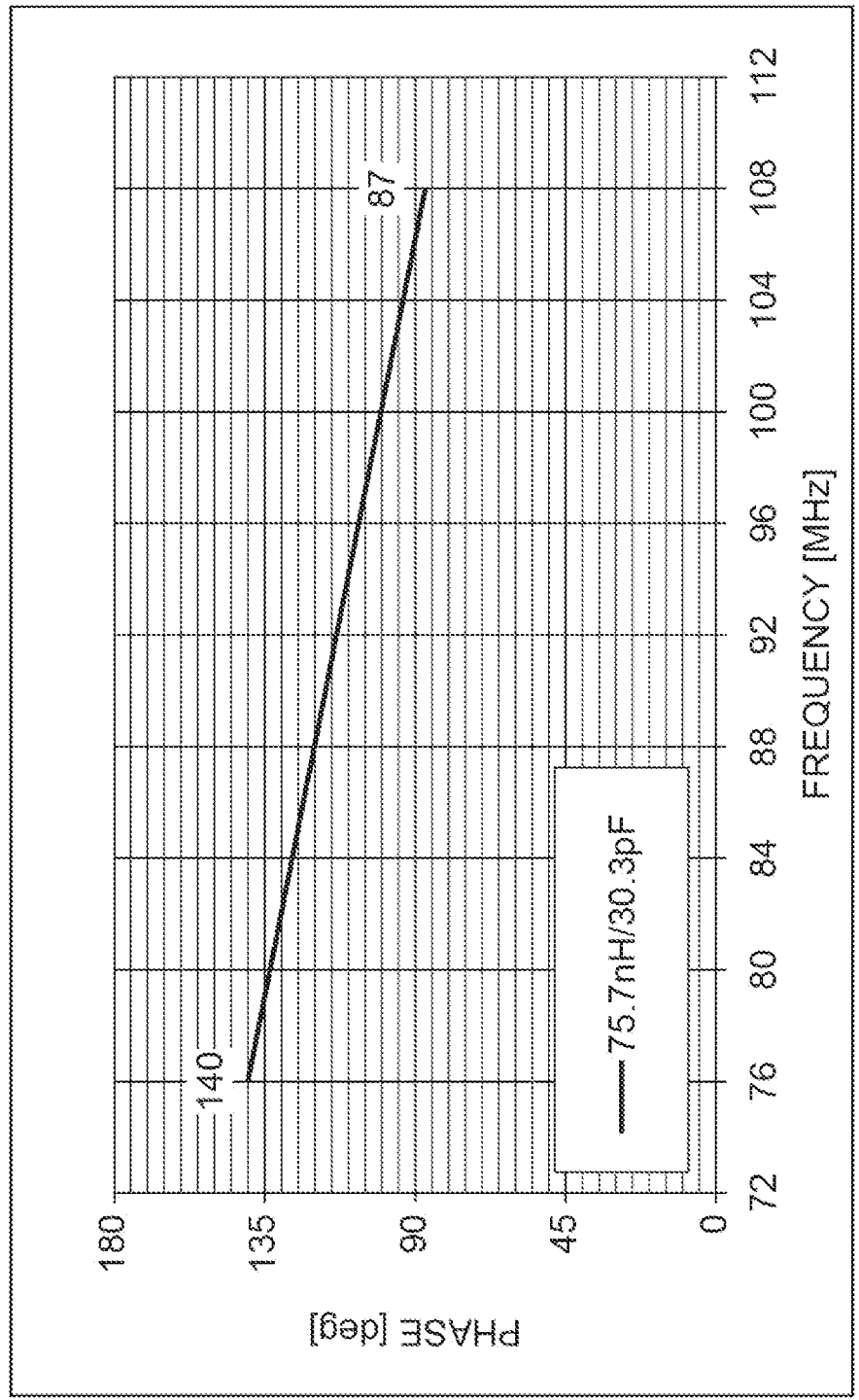
FIG. 24 is a diagram showing a phase shift characteristic of a phase difference absorption circuit used in the fourth arrangement example.

FIG. 24 shows the phase shift characteristic of the phase difference absorption circuit 20D used in the fourth arrangement example. In addition, the phase shift characteristic of the phase difference absorption circuit 20D indicates the amount of phase advance of the output signal with respect to the input signal of the phase difference absorption circuit 20D. The phase shift characteristic shown in FIG. 24 can be obtained by making the circuit configuration of the phase difference absorption circuit 20D be a a-type one-stage configuration having an inductance of 75.7 nH and a capacitance of 30.3 pF.

As shown in FIG. 24, when a signal having a frequency of 76 MHz is input, the phase difference absorption circuit 20D outputs the signal after shifting the phase of the signal by +140° (that is, the phase advances by 140°). In addition, when a signal having a frequency of 108 MHz is input, the phase difference absorption circuit 20D outputs the signal after shifting the phase of the signal by +87° (that is, the phase advances by 87°). As shown in FIG. 20, the phase difference absorption circuit 20D is provided between the first antenna 12 and the combiner 22D. Therefore, the phase difference absorption circuit 20D changes the phase of the first signal S1 received by the first antenna 12 according to the phase shift characteristic.

For example, the noise signal having a frequency of 76 MHz output from the noise source N1 is phase-shifted by −91° due to propagating through the first propagation path P1 (see FIG. 21) and phase-shifted by +140° due to passing through the phase difference absorption circuit 20D (see FIG. 24). As a result, a phase shift of +49° occurs in this noise signal. On the other hand, the noise signal having a frequency of 108 MHz output from the noise source N1 is phase-shifted by −130° due to passing through the first propagation path P1 (see FIG. 21) and phase-shifted by +87° due to passing through the phase difference absorption circuit 20D (see FIG. 24). As a result, a phase shift of −43° occurs in this noise signal.

Therefore, when the noise signal having a frequency of 76 MHz passes through the phase difference absorption circuit 20D and the second propagation path P2, the phase difference θ1 of the noise signal is 270° (=49°+221°). On the other hand, when the noise signal having a frequency of 108 MHz passes through the phase difference absorption circuit 20D and the second propagation path P2, the phase difference θ2 of the noise signal is 270° (=−43°+313°). As a result, the phase difference between the noise signal included in the first signal S1 that has passed through the first propagation path P1 and the phase difference absorption circuit 20D and the noise signal that has passed through the second propagation path becomes a constant angle (270°) in the entire frequency band of the FM band.

The combiner 22D shifts the phase of the second signal S2 by 270° (−90°), and combines the first signal S1 output from the phase difference absorption circuit 20D and the phase-shifted second signal S2. Therefore, the noise signal included in the first signal S1 and the noise signal included in the second signal S2 are combined in opposite phases. As a result, the noise signal caused by the noise source N1 is removed from the first signal S1.

In the noise reduction devices 1, 1A, 1B, 1C, and 1D according to the embodiments described above, each of the phase difference absorption circuits 20, 20D, and 47 has a phase shift characteristic that reduces the difference between the phase difference θ1 and the phase difference θ2 of the two noise signals. In this manner, the phase difference between the first signal S1 propagating through the first propagation path P1 and the second signal S2 propagating through the second propagation path P2 can be made almost constant in the entire frequency band of the broadcast wave. Therefore, by shifting the phase of the first signal S1 or the second signal S2 by a predetermined angle, the first signal S1 and the second signal S2 can be made to have almost opposite phases. Then, by combining the first signal S1 and the second signal S2 having opposite phases by the combiners 22 and 22A, the noises caused by the noise sources N1 and N2 can be canceled out. As a result, it is possible to reduce the noise included in the first signal S1 received by the first antenna 12. In addition, in the noise reduction devices 1, 1A, 1B, 1C, since the first signal S1 and the second signal S2 can be made to have almost opposite phases by the phase difference absorption circuits 20, 20D, and 47, it is possible to reduce noise with a simple configuration.

In addition, in the noise reduction devices 1, 1A, 1B, 1C, and 1D according to the embodiments described above, when the first in-band phase deviation D1 is smaller than the second in-band phase deviation D2, the phase difference absorption circuits 20 and 20D are disposed between the first antenna 12 and the combiner 22, and when the first in-band phase deviation D1 is larger than the second in-band phase deviation D2, the phase difference absorption circuits 20 and 20D are disposed between the second antenna 14 and the combiner 22. As a result, the phase difference between the first signal S1 and the second signal S2 can be easily made almost constant.

While the noise reduction devices according to the various embodiments have been described above, various modifications can be made without changing the gist of the invention without being limited to the embodiments described above.

For example, in the embodiment described above, the phase difference absorption circuit 20 has a phase shift characteristic that makes the phase difference θ1 and the phase difference θ2 be 0°. However, the phase difference absorption circuit 20 may have at least a phase shift characteristic that reduces the difference between the phase difference θ1 and the phase difference θ2. By reducing the difference between the phase difference θ1 and the phase difference θ2, the phase difference between the signal that has passed through the first propagation path Pt and the phase difference absorption circuit 20 and the signal that has propagated through the second propagation path P2 can be made almost constant in the entire frequency band of the broadcast wave. In this case, the two signals can be made to have the same phase by using a phase shifter that causes a phase shift by an angle corresponding to the constant phase difference.

In addition, in the noise reduction device 1, the combiner 22 is a 180° coupler, but the combiner 22 is not limited to the 180° coupler. For example, a 90° coupler, an adder, a subtractor, and the like may be used as the combiner 22. In addition, in the embodiments described above, the noise reduction devices 1, 1A, 1B, and 1C are disposed in the vicinity of the first antenna 12, but the positions of 1, 1A, 1B, and 1C are not limited to the vicinity of the first antenna 12.

In addition, in the noise reduction device 1C shown in FIG. 14, the phase difference absorption circuit is provided between the first antenna 12 and the combiner 22 and between the third antenna 16 and the combiner 22, but the phase difference absorption circuit may be further provided between the second antenna 14 and the combiner 22.

In the embodiment described above, as a broadcast wave received by the first antenna 12, the broadcast wave of the FM band (76 MHz to 108 MHz) has been mainly described as an example. However, the broadcast wave received by the first antenna 12 may be a broadcast wave in the AM band (0.5 MHz to 1.7 MHz), the DAB band (digital radio broadcast, 174 MHz to 240 MHz), and the DTV band (digital television broadcast, 470 MHz to 710 MHz). In addition, the lower limit frequency and the upper limit frequency described above do not necessarily have to match the target frequency of the broadcast wave as long as the lower limit frequency and the upper limit frequency are within the range where the same effect can be obtained. For example, when the received broadcast wave is in the FM band, the lower limit frequency may be 75 MHz and the upper limit frequency may be 109 MHz.

In addition, in the embodiment described above, the first antenna 12 is a shark fin antenna disposed on the roof, but any antenna can be used as the first antenna 12. In addition, the various embodiments described above can be combined to the extent that there is no contradiction.

REFERENCE SIGNS LIST 1, 1A, 1B, 1C: noise reduction device, 10, 10A: in-vehicle antenna device, 12: first antenna, 14: second antenna, 16: third antenna, 20, 47: phase difference absorption circuit, 22, 22A: combiner, 22A: combiner, 24: amplitude changer, 25: phase changer, 26: receiving circuit, 27: control unit, 28: phase inverter, 29: adder, 31: space propagation path, 32: space propagation path, 33: space propagation path, 34: space propagation path, 41: conducting w % ire propagation path, 42: conducting wire propagation path, 43: conducting wire propagation path, 100: vehicle, D1: first in-band phase deviation, D2: second in-band phase deviation, N1, N2: noise source, P1: first propagation path, P2: second propagation path, S1: first signal, S2: second signal.

The invention claimed is:

1. A noise reduction device connected to a first antenna for receiving a broadcast wave and a second antenna, the noise reduction device comprising:
   a combiner to shift a phase of one of a first signal propagating through a first propagation path and a second signal propagating through a second propagation path by a predetermined angle and combine the phase-shifted one signal of the first signal and the second signal with the other signal of the first signal and the second signal, wherein the first propagation path is a path of signal reaching the noise reduction device from a noise source of a vehicle via the first antenna and the second propagation path is a path of signal reaching the noise reduction device from the noise source of the vehicle via the second antenna; and
   a phase difference absorption circuit provided between the first antenna and the combiner or between the second antenna and the combiner,
   wherein the phase difference absorption circuit has a phase shift characteristic that reduces a difference between a phase difference between two signals each having a lower limit frequency of a band of the broadcast wave and passing through the first propagation path and the second propagation path and a phase difference between two signals each having an upper limit frequency of the band of the broadcast wave and passing through the first propagation path and the second propagation path,
   when a first in-band phase deviation indicating a difference between a phase shift amount when a signal having the lower limit frequency passes through the first propagation path and a phase shift amount when a signal having the upper limit frequency passes through the first propagation path is smaller than a second in-band phase deviation indicating a difference between a phase shift amount when a signal having the lower limit frequency passes through the second propagation path and a phase shift amount when a signal having the upper limit frequency passes through the second propagation path, the phase difference absorption circuit is disposed between the first antenna and the combiner, and
   when the first in-band phase deviation is larger than the second in-band phase deviation, the phase difference absorption circuit is disposed between the second antenna and the combiner.

2. The noise reduction device according to claim 1, wherein
   the second antenna is disposed at a position closer to the noise source than the first antenna.

3. The noise reduction device according to claim 1, further comprising:
   an amplitude changer; and
   a phase changer,
   wherein the amplitude changer and the phase changer are provided between the first antenna and the combiner or between the second antenna and the combiner.

4. The noise reduction device according to claim 3, further comprising:
   a control unit configured to acquire power of noise included in the signal combined by the combiner and adjust the amplitude changer and the phase changer so that the power of the noise is reduced.

5. The noise reduction device according to claim 1, wherein
   the combiner is a 180° coupler to invert the phase of the one signal and combine the phase-inverted one signal and the other signal.

6. The noise reduction device according to claim 1, wherein
   the combiner includes:
      a phase inverter to invert the phase of the one signal; and
      an adder to add the phase-inverted one signal and the other signal.

* * * * *